US009978312B2

(12) United States Patent
Yang et al.

(10) Patent No.: US 9,978,312 B2
(45) Date of Patent: May 22, 2018

(54) PIXEL CIRCUIT AND A DRIVING METHOD THEREOF, A DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Yingming Liu, Beijing (CN); Weijie Zhao, Beijing (CN); Xiaoliang Ding, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/122,631

(22) PCT Filed: Jul. 15, 2015

(86) PCT No.: PCT/CN2015/084090
§ 371 (c)(1),
(2) Date: Aug. 30, 2016

(87) PCT Pub. No.: WO2016/173121
PCT Pub. Date: Nov. 3, 2016

(65) Prior Publication Data
US 2017/0103706 A1 Apr. 13, 2017

(30) Foreign Application Priority Data

Apr. 28, 2015 (CN) .......................... 2015 1 0209479

(51) Int. Cl.
*G06K 9/00* (2006.01)
*G06F 3/044* (2006.01)
(Continued)

(52) U.S. Cl.
CPC ........... *G09G 3/3258* (2013.01); *G06F 3/044* (2013.01); *G06F 3/0416* (2013.01);
(Continued)

(58) Field of Classification Search
CPC ............... G09G 3/3258; G09G 3/3233; G09G 2300/0809; G09G 2310/0202;
(Continued)

(56) References Cited

U.S. PATENT DOCUMENTS 9,671,906 B2 * 6/2017 Yang ........................ G06F 3/044
9,727,186 B2 * 8/2017 Yang ....................... G06F 3/044
(Continued)

FOREIGN PATENT DOCUMENTS

CN 101364262 A 2/2009
CN 102119408 A 7/2011
(Continued)

OTHER PUBLICATIONS

International Search Report and Written Opinion in PCT/CN2015/084090 dated Jan. 20, 2016, with English translation. 16 pages.
(Continued)

*Primary Examiner* — Antonio Xavier
(74) *Attorney, Agent, or Firm* — Womble Bond Dickinson (US) LLP

(57) ABSTRACT

The present invention provides a pixel circuit and a driving method thereof, a display device. The pixel circuit comprises a display driving module, a compensation module, a light emitting module and a fingerprint identification module. The compensation module is connected with the display driving module, a first signal terminal, a second signal (Continued)

terminal, a third signal terminal, a first voltage terminal, a data signal terminal and a common voltage terminal respectively. The display driving module is further connected with the light emitting module. The light emitting module is further connected with an enable signal terminal, the first voltage terminal and a second voltage terminal. The fingerprint identification module is connected with a fourth signal terminal, a fifth signal terminal and a readout signal line respectively.

10 Claims, 13 Drawing Sheets

(51) Int. Cl.
    *G09G 3/32*        (2016.01)
    *G09G 3/3258*    (2016.01)
    *G09G 3/3233*    (2016.01)
    *G06F 3/041*     (2006.01)

(52) U.S. Cl.
    CPC ....... G06K 9/00013 (2013.01); G09G 3/3233 (2013.01); *G09G 2300/0809* (2013.01); *G09G 2310/0202* (2013.01); *G09G 2310/0297* (2013.01); *G09G 2320/0233* (2013.01)

(58) Field of Classification Search
    CPC .... G09G 2310/0297; G09G 2320/0233; G06F 3/0416; G06F 3/044; G06K 9/00013
    See application file for complete search history.

(56) References Cited

U.S. PATENT DOCUMENTS

| | | | | |
|---|---|---|---|---|
| 9,760,199 | B2* | 9/2017 | Yang | G06F 3/0412 |
| 2007/0216657 | A1* | 9/2007 | Konicek | G06F 3/0412 |
| | | | | 345/173 |
| 2010/0073266 | A1 | 3/2010 | Na et al. | |
| 2011/0063252 | A1* | 3/2011 | Chang | G06F 3/0412 |
| | | | | 345/175 |
| 2012/0075229 | A1* | 3/2012 | Summers | G06F 3/044 |
| | | | | 345/173 |
| 2012/0195475 | A1* | 8/2012 | Abiko | G06T 7/00 |
| | | | | 382/115 |
| 2015/0053947 | A1* | 2/2015 | Qing | G09G 3/3233 |
| | | | | 257/40 |
| 2015/0221255 | A1* | 8/2015 | Qing | G06F 3/0412 |
| | | | | 345/173 |
| 2015/0348504 | A1* | 12/2015 | Sakariya | G09G 3/3233 |
| | | | | 345/206 |
| 2016/0180775 | A1* | 6/2016 | Kim | G09G 3/3233 |
| | | | | 345/205 |
| 2016/0204166 | A1* | 7/2016 | Yang | H01L 27/323 |
| | | | | 345/173 |
| 2016/0253541 | A1* | 9/2016 | Yang | G09G 3/32 |
| | | | | 382/124 |
| 2016/0253959 | A1* | 9/2016 | Sun | G09G 3/2003 |
| 2016/0260380 | A1* | 9/2016 | Yang | G09G 3/32 |
| 2017/0097734 | A1* | 4/2017 | Yang | G06F 3/0418 |

FOREIGN PATENT DOCUMENTS

| | | |
|---|---|---|
| CN | 103530609 A | 1/2014 |
| CN | 203503280 U | 3/2014 |
| CN | 104036723 A | 9/2014 |
| CN | 104103239 A | 10/2014 |
| CN | 104112120 A | 10/2014 |
| CN | 104155785 A | 11/2014 |
| CN | 104200768 A | 12/2014 |
| CN | 104282265 A | 1/2015 |
| JP | 2004016407 A | 1/2004 |

OTHER PUBLICATIONS

Office Action in Chinese Application No. 201510209479.4 dated Nov. 26, 2015, with English translation. 8 pages.

* cited by examiner

PIXEL CIRCUIT AND A DRIVING METHOD THEREOF, A DISPLAY DEVICE

The present application is the U.S. national phase entry of PCT/CN2015/084090, with an international filing date of Jul. 15, 2015, which claims the benefit of Chinese Patent Application No. 201510209479.4, filed on Apr. 28, 2015, the entire disclosure of which is incorporated herein by reference.

FIELD OF THE INVENTION

The present invention relates to the field of display technology, particularly to a pixel circuit and a driving method thereof, a display device.

BACKGROUND OF THE INVENTION

With the rapid development of the display technology, the semiconductor element technology as a core of display devices also gets great and rapid progress accordingly. For existing display devices, the organic light emitting diode (OLED) as a current-type light emitting device, has been more and more applied in the field of high performance display by right of its characteristics of self-luminous, quick response, wide view angle and manufacturably on a flexible substrate.

The OLED can be divided into passive matrix driving OLED (PMOLED) and active matrix driving OLED (AMOLED) according to the driving modes. Because the AMOLED display has the advantages of low manufacture cost, high response speed, power saving, DC driving available for a portable device, wide range of operating temperature etc., it is desirable to become the next generation of new flat panel displays in place of the liquid crystal display (LCD). In the existing AMOLED display panel, each OLED includes a plurality of thin film transistor (TFT) switch circuits. The amorphous silicon TFT is taken as an important electronic device because it has excellent static electricity characteristics, and has been widely used in liquid crystal displays and matrix image sensors etc.

However, in the prior art, the instability of the amorphous silicon TFT has always been an unsolved problem. A main instability of the amorphous silicon TFT is that shifts of the TFT threshold voltage may occur when it is applied with a DC gate bias for a long time. Specifically, in a high voltage area (generally greater than 25V), the threshold voltage shift is caused by shielding of the gate electric field after the trap in the insulating layer captures charges. In a low voltage area (generally the working voltage of the amorphous silicon TFT), the threshold voltage shift is caused by generation or elimination of dangling bond states due to bias in the active layer. The threshold voltage shift as above may result in decrease of the luminance of the AMOLED display, thereby influencing brightness constancy of the display. In addition, because the TFT in the AMOLED under the working state may be in a bias state for a long time, it accelerates attenuation of the TFT, thereby reducing the lifetime of the display device.

In addition, the fingerprint identification function is one of the commonly used functions of the electronic devices at present. It is important in enhancing security of the electronic device and expanding its application scope etc. However, most of current AMOLED displays do not have the fingerprint identification function, or they have to add an independent fingerprint identification circuit to achieve the purpose of fingerprint identification. In this way, however, the structure will be complex and the cost will be increased.

SUMMARY OF THE INVENTION

Embodiments of the present invention provide a pixel circuit and a driving method thereof, a display device, which can avoid shifts of a threshold voltage from influencing the brightness uniformity and constancy of the display, while enabling the display device with the pixel circuit to possess a fingerprint identification function.

In order to achieve the above object, embodiments of the present invention adopt the following technical solutions:

An aspect of the present invention provides a pixel circuit, comprising a display driving module, a compensation module, a light emitting module and a fingerprint identification module.

The compensation module is connected with the display driving module, a first signal terminal, a second signal terminal, a third signal terminal, a first voltage terminal, a data signal terminal and a common voltage terminal respectively, for compensating the display driving module for a threshold voltage through signals inputted by the first voltage terminal and the data signal terminal under the control of the first signal terminal, the second signal terminal, and the third signal terminal.

The display driving module is further connected with the light emitting module, for driving the light emitting module to emit light after the display driving module obtains the compensation for the threshold voltage.

The light emitting module is further connected with an enable signal terminal, the first voltage terminal and the second voltage terminal, for emitting light through driving of the display driving module under the control of the enable signal terminal, the first voltage terminal and the second voltage terminal.

The fingerprint identification module is connected with a fourth signal terminal, a fifth signal terminal and a readout signal line respectively, for collecting fingerprint information under the control of the fourth signal terminal and the fifth signal terminal, and transmitting the collected fingerprint information to the readout signal line.

The third signal terminal and the fifth signal terminal are connected with a third scanning signal line. The second signal terminal and the fourth signal terminal are connected with a second scanning signal line.

Or, the second signal terminal and the fifth signal terminal are connected with the second scanning signal line. The first signal terminal and the fourth signal terminal are connected with a first scanning signal line.

Or, the third signal terminal and the fifth signal terminal are connected with the third scanning signal line. The first signal terminal and the fourth signal terminal are connected with the first scanning signal line. The compensation module is further connected with the second voltage terminal.

Another aspect of the present invention provides a display device comprising any pixel circuit as stated above, and a signal receiving device connected with the readout signal line, for receiving fingerprint information outputted by the readout signal line.

A further aspect of the present invention provides a method for driving a pixel circuit, for driving any pixel circuit as stated above. When the third signal terminal and the fifth signal terminal are connected with the third scanning signal line, the second signal terminal and the fourth signal terminal are connected with the second scanning signal line, the method comprises:

at a first phase, the first scanning signal line inputs a signal to the first signal terminal to reset the display driving module so as to remove a residual voltage;

at a second phase, the second scanning signal line inputs a signal to the second signal terminal and the fourth signal terminal to reset the fingerprint identification module and collect the fingerprint information; the signal inputted by the common voltage terminal charges the compensation module;

at a third phase, the third scanning signal line inputs a signal to the third signal terminal and the fifth signal terminal to keep the compensation module in a turn-on state, and compensate the display driving module for a threshold voltage based on signals inputted by the first voltage terminal and the data signal terminal;

the fingerprint identification module transmits the collected fingerprint information to the readout signal line;

at a fourth phase, the enable signal terminal inputs a signal to turn on the light emitting module, and drive the light emitting module to emit light by the display driving module.

A further aspect of the present invention provides a method for driving a pixel circuit, for driving any pixel circuit as stated above. When the second signal terminal and the fifth signal terminal are connected with the second scanning signal line, the first signal terminal and the fourth signal terminal are connected with the first scanning signal line, the method comprises:

at a first phase, the first scanning signal line inputs a signal to the first signal terminal and the fourth signal terminal to reset the display driving module and the fingerprint identification module so as to remove the residual voltage;

at a second phase, the second scanning signal line inputs a signal to the second signal terminal and the fifth signal terminal to collect the fingerprint information by the fingerprint identification module and transmit the collected fingerprint information to the readout signal line; the signal inputted by the first voltage terminal charges the compensation module;

at a third phase, the third scanning signal line inputs a signal to the third signal terminal to keep the compensation module in a turn-on state, and compensate the display driving module for a threshold voltage based on signals inputted by the first voltage terminal and the data signal terminal;

at a fourth phase, the enable signal terminal inputs a signal to turn on the light emitting module, and drive the light emitting module to emit light by the display driving module.

A further aspect of the present invention provides a method for driving a pixel circuit, for driving any pixel circuit as stated above. When the third signal terminal and the fifth signal terminal are connected with the third scanning signal line, the first signal terminal and the fourth signal terminal are connected with the first scanning signal line, the method comprises:

at a first phase, the first scanning signal line inputs a signal to the first signal terminal and the fourth signal terminal to reset the display driving module and the fingerprint identification module so as to remove the residual voltage;

at a second phase, the second scanning signal line inputs a signal to the second signal terminal to collect the fingerprint information by the fingerprint identification module; the signal inputted by the second voltage terminal charges the compensation module;

at a third phase, the third scanning signal line inputs a signal to the third signal terminal and the fifth signal terminal to keep the compensation module in a turn-on state, and compensate the display driving module for a threshold voltage based on signals inputted by the first voltage terminal and the data signal terminal;

the fingerprint identification module transmits the collected fingerprint information to the readout signal line;

at a fourth phase, the enable signal terminal inputs a signal to turn on the light emitting module, and drive the light emitting module to emit light by the display driving module.

Embodiments of the present invention provide a pixel circuit and a driving method thereof, a display device. The pixel circuit comprises a display driving module, a compensation module, a light emitting module and a fingerprint identification module. Specifically, the compensation module is connected with the display driving module, a first signal terminal, a second signal terminal, a third signal terminal, a first voltage terminal, a data signal terminal and a common voltage terminal respectively, for compensating the display driving module for a threshold voltage through signals inputted by the first voltage terminal and the data signal terminal under the control of the first signal terminal, the second signal terminal, and the third signal terminal. The display driving module is further connected with the light emitting module, for driving the light emitting module to emit light after the display driving module obtains the compensation for the threshold voltage. The light emitting module is further connected with an enable signal terminal, the first voltage terminal and the second voltage terminal, for emitting light through driving of the display driving module under the control of the enable signal terminal, the first voltage terminal and the second voltage terminal. The fingerprint identification module is connected with a fourth signal terminal, a fifth signal terminal and a readout signal line respectively, for collecting fingerprint information under the control of the fourth signal terminal and the fifth signal terminal, and transmitting the collected fingerprint information to the readout signal line. The third signal terminal and the fifth signal terminal are connected with a third scanning signal line, and the second signal terminal and the fourth signal terminal are connected with a second scanning signal line. Or, the second signal terminal and the fifth signal terminal are connected with the second scanning signal line, and the first signal terminal and the fourth signal terminal are connected with a first scanning signal line. Or, the third signal terminal and the fifth signal terminal are connected with the third scanning signal line, and the first signal terminal and the fourth signal terminal are connected with the first scanning signal line. The compensation module is further connected with the second voltage terminal.

In this way, the same signal can be inputted to the third signal terminal and the fifth signal terminal through the third scanning signal line. The same signal can be inputted to the second signal terminal and the fourth signal terminal through the second scanning signal line. Or, the same signal is inputted to the second signal terminal and the fifth signal terminal through the second scanning signal line. The same signal is inputted to the first signal terminal and the fourth signal terminal through the first scanning signal line. Or, the same signal is inputted to the third signal terminal and the fifth signal terminal through the third scanning signal line. The same signal is inputted to the first signal terminal and the fourth signal terminal through the first scanning signal line. Because the first signal terminal, the second signal terminal, the third signal terminal and the compensation module are connected with each other, and the fourth signal terminal, the fifth signal terminal and the fingerprint module are connected with each other, on the one hand, under the control of the first scanning signal line, the second scanning signal line and the third scanning signal line, compensation for a threshold voltage can be made to the display driving module through the signals inputted by the first voltage terminal and the data signal terminal, so as to enable the display driving module, in the process of driving the light emitting module to emit light, to avoid the driving current from being influenced by shifts of the threshold voltage, thereby providing brightness constancy of the display. On the other hand, any two of the first scanning signal line, the second scanning signal line and the third scanning signal line can also, through the fourth signal terminal and the fifth signal terminal connected with the fingerprint identification module, control the fingerprint identification module to collect the fingerprint information and transmit the collected fingerprint information to the readout signal line, so as to achieve the object of fingerprint identification. Therefore, in the pixel circuit integrated with a compensation module and a fingerprint identification module provided by the present invention, the compensation module and the fingerprint identification module can be controlled simultaneously by multiplexing the first scanning signal line, the second scanning signal line and the third scanning signal line, so as to simplify the structure of the display with the identification function and improve the brightness constancy of the display through compensation for the threshold voltage.

BRIEF DESCRIPTION OF THE DRAWINGS

In order to explain the embodiments of the present invention or the technical solution in the prior art more clearly, the drawings to be used in the description of the embodiments or the prior art will be introduced briefly next. Apparently, the drawings described below are only some embodiments of the present invention. For the ordinary skilled person in the art, other drawings can also be obtained based on these drawings without any creative work.

DETAILED DESCRIPTION OF THE INVENTION

Next, the technical solutions in the embodiments of the present invention will be described clearly and completely with reference to the drawings in the embodiments of the present invention. Apparently, the embodiments described are only a part of rather than all of the embodiments of the present invention. Based on the embodiments of the present invention, all other embodiments obtained by the ordinary skilled person in the art without any creative work belong to the protection scope of the present invention.

Figure 1:
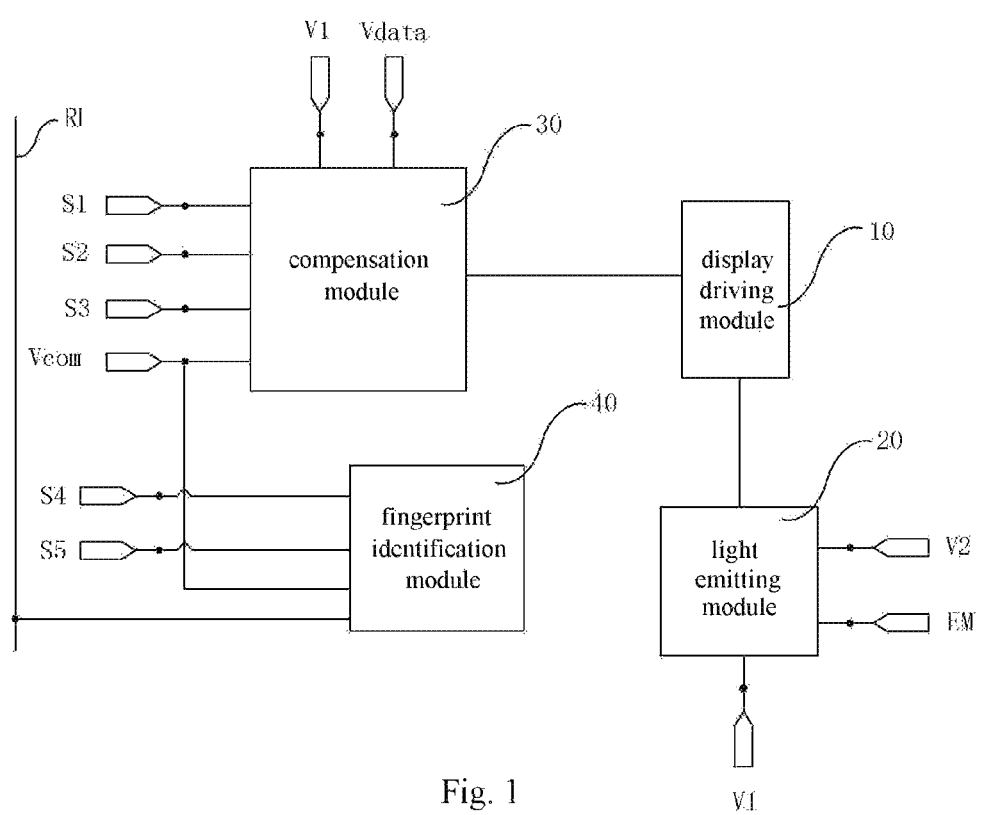
FIG. 1 is a structural schematic view of a pixel circuit provided by embodiments of the present invention.

Embodiments of the present invention provide a pixel circuit, as shown in FIG. 1. It may comprise a display driving module 10, a compensation module 30, a light emitting module 20 and a fingerprint identification module 40.

Specifically, the compensation module 30 can be connected with the display driving module 10, a first signal terminal S1, a second signal terminal S2, a third signal terminal S3, a first voltage terminal V1, a data signal terminal Vdata and a common voltage terminal Vcom, for charging the compensation module 30 and compensating the display driving module 10 for a threshold voltage Vth through signals inputted by the first voltage terminal V1 and the data signal terminal Vdata under the control of the first signal terminal S1, the second signal terminal S2, and the third signal terminal S3.

The display driving module 10 can be further connected with the light emitting module 20, for driving the light emitting module 20 to emit light when the display driving module 10 obtains the compensation for the threshold voltage Vth.

The light emitting module 20 can be further connected with an enable signal terminal EM, the first voltage terminal V1 and the second voltage terminal V2, for emitting light through driving of the display driving module 10 under the control of the enable signal terminal EM, the first voltage terminal V1 and the second voltage terminal V2.

The fingerprint identification module 40 can be connected with a fourth signal terminal S4, a fifth signal terminal S5 and a readout signal line RL respectively, for collecting fingerprint information under the control of the fourth signal terminal S4 and the fifth signal terminal S5, and transmitting the collected fingerprint information to the readout signal line RL.

The third signal terminal S3 and the fifth signal terminal S5 are connected with a third scanning signal line Scan3. The second signal terminal S2 and the fourth signal terminal S4 are connected with a second scanning signal line Scan2.

Or, the second signal terminal S2 and the fifth signal terminal S5 are connected with the second scanning signal line Scan2. The first signal terminal S1 and the fourth signal terminal S4 are connected with a first scanning signal line Scan1.

Or, the third signal terminal S3 and the fifth signal terminal S5 are connected with the third scanning signal line Scan3. The first signal terminal S1 and the fourth signal terminal S4 are connected with the first scanning signal line Scan1. Moreover, the compensation module 30 can be further connected with the second voltage terminal V2.

It should be noted that firstly, in all embodiments of the present invention, for example, the first voltage terminal V1 is connected to the ground GND and the second voltage terminal V2 is connected to a power supply voltage terminal Vdd.

Secondly, the fingerprint information is related to the ridge line or the valley line of the fingerprint.

Embodiments of the present invention provide a pixel circuit comprising a display driving module, a compensation module, a light emitting module and a fingerprint identification module. Specifically, the compensation module is connected with the display driving module, a first signal terminal, a second signal terminal, a third signal terminal, a first voltage terminal, a data signal terminal and a common voltage terminal respectively, for compensating the display driving module for a threshold voltage through signals inputted by the first voltage terminal and the data signal terminal under the control of the first signal terminal, the second signal terminal, and the third signal terminal. The display driving module is further connected with the light emitting module, for driving the light emitting module to emit light after the display driving module obtains the compensation for the threshold voltage. The light emitting module is further connected with an enable signal terminal, the first voltage terminal and the second voltage terminal, for emitting light through driving of the display driving module under the control of the enable signal terminal, the first voltage terminal and the second voltage terminal. The fingerprint identification module is connected with a fourth signal terminal, a fifth signal terminal and a readout signal line respectively, for collecting fingerprint information under the control of the fourth signal terminal and the fifth signal terminal, and transmitting the collected fingerprint information to the readout signal line. The third signal terminal and the fifth signal terminal are connected with a third scanning signal line, the second signal terminal and the fourth signal terminal are connected with a second scanning signal line. Or, the second signal terminal and the fifth signal terminal are connected with the second scanning signal line, the first signal terminal and the fourth signal terminal are connected with a first scanning signal line. Or, the third signal terminal and the fifth signal terminal are connected with the third scanning signal line, the first signal terminal and the fourth signal terminal are connected with the first scanning signal line, and the compensation module is further connected with the second voltage terminal.

In this way, the same signal can be inputted to the third signal terminal and the fifth signal terminal through the third scanning signal line. The same signal can be inputted to the second signal terminal and the fourth signal terminal through the second scanning signal line. Or, the same signal is inputted to the second signal terminal and the fifth signal terminal through the second scanning signal line. The same signal is inputted to the first signal terminal and the fourth signal terminal through the first scanning signal line. Or, the same signal is inputted to the third signal terminal and the fifth signal terminal through the third scanning signal line. The same signal is inputted to the first signal terminal and the fourth signal terminal through the first scanning signal line. Because the first signal terminal, the second signal terminal, the third signal terminal and the compensation module are connected with each other, and the fourth signal terminal, the fifth signal terminal and the fingerprint module are connected with each other, on the one hand, under the control of the first scanning signal line, the second scanning signal line and the third scanning signal line, compensation for a threshold voltage can be made to the display driving module through the signals inputted by the first voltage terminal and the data signal terminal, so as to enable the display driving module, in the process of driving the light emitting module to emit light, to avoid the driving current from being influenced by shifts of the threshold voltage, thereby providing brightness constancy of the display. On the other hand, any two of the first scanning signal line, the second scanning signal line and the third scanning signal line can also, through the fourth signal terminal and the fifth signal terminal connected with the fingerprint identification module, control the fingerprint identification module to collect the fingerprint information and transmit the collected fingerprint information to the readout signal line, so as to achieve the object of fingerprint identification. Therefore, in the pixel circuit integrated with a compensation module and a fingerprint identification module provided by the present invention, the compensation module and the fingerprint identification module can be controlled simultaneously by multiplexing the first scanning signal line, the second scanning signal line and the third scanning signal line, so as to simplify the structure of the display with the identification function and improve the brightness constancy of the display through compensation for the threshold voltage.

Next, structures of the above pixel circuit will be illustrated in detail through specific embodiments.

Embodiment One

Figure 2:
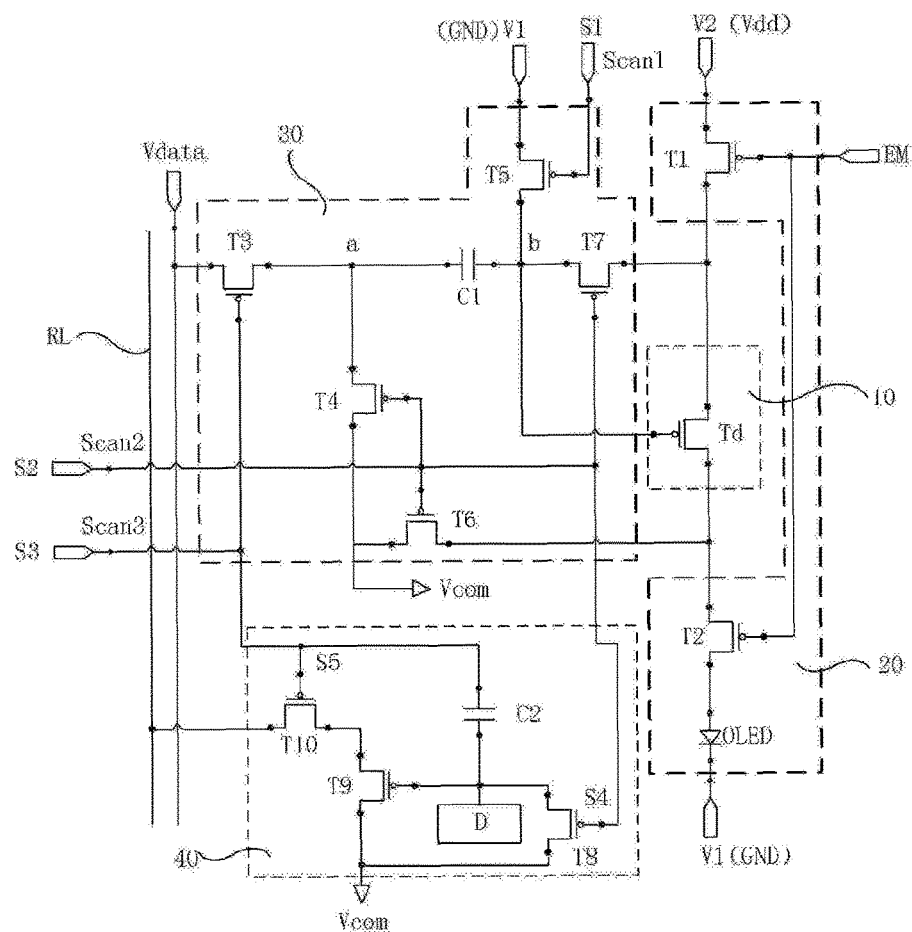
FIG. 2 is a specific structural schematic view of respective modules of the pixel circuit as shown in FIG. 1.

In the structure of the pixel circuit provided by this embodiment, as shown in FIG. 2, for example, the third signal terminal S3 of the compensation module 30 and the fifth signal terminal S5 of the fingerprint identification module 40 are connected with the same signal line, i.e., the third scanning signal line Scan3, and the second signal terminal S2 of the compensation module 30 and the fourth signal terminal S4 of the fingerprint identification module 40 are connected with the same signal line, i.e., the second scanning signal line Scan2, so as to achieve the object of multiplexing the third scanning signal line Scan3 and the second scanning signal line Scan2.

The specific structures in the above respective modules will be illustrated in the following.

The display driving module 10 can comprise: a driving transistor Td.

A gate of the driving transistor Td is connected with the compensation module 30. A first terminal and a second terminal of the driving transistor Td are connected with the light emitting module 20.

It should be noted that the above display driving module 10 can further comprises a plurality of driving transistors Td connected in parallel. Or, it can further comprises a capacitor, one terminal of which is connected with the gate of the driving transistor Td, and the other terminal is connected with the drain of the driving transistor Td. The above is only an example of the display driving module. Other structures with the same function as the display driving module 10 will not be repeated here any more; however, they should all belong to the claimed scope of the present invention.

The light emitting module 20 can comprise: a first transistor T1, a second transistor T2 and a light emitting device.

It should be noted that the light emitting device in embodiments of the present invention can be various current driven light emitting devices including light emitting diode (LED) or organic light emitting diode (OLED) in the prior art. In embodiments of the present invention, illustration is made by taking OLED as the example.

A gate of the first transistor T1 is connected with the enable signal terminal EM. A first terminal of the first transistor T1 is connected with the display driving module 10. A second terminal of the first transistor T1 is connected with the second voltage terminal V2. When the display driving module 10 is the above structure, the first terminal of the first transistor T1 is connected with the first terminal of the driving transistor Td.

A gate of the second transistor T2 is connected with the enable signal terminal EM. A first terminal of the second transistor T2 is connected with an anode of the light emitting device OLED. A second terminal of the second transistor T2 is connected with the display driving module 10. When the display driving module 10 is the above structure, the second terminal of the second transistor T2 is connected with the second terminal of the driving transistor Td.

A cathode of the light emitting device OLED is connected with the first voltage terminal V1, i.e., grounding GND.

It should be noted that the light emitting module 20 can further comprises a plurality of switch transistors connected with the first transistor T1 or the second transistor T2 in parallel. The above is only an example of the light emitting module 20. Other structures with the same function as the light emitting module 20 will not be repeated here any more; however, they should all belong to the claimed scope of the present invention.

The fingerprint identification module 40 can comprise: an eighth transistor T8, a ninth transistor T9, a tenth transistor T10, a second capacitor C2 and a detection electrode D.

A gate of the eighth transistor T8 is connected with the fourth signal terminal S4. A first terminal of the eighth transistor T8 is connected with the common voltage terminal Vcom. A second terminal of the eighth transistor T8 is connected with one terminal of the second capacitor C2.

A gate of the ninth transistor T9 is connected with the one terminal of the second capacitor C2. A first terminal of the ninth transistor T9 is connected with the common voltage terminal Vcom. A second terminal of the ninth transistor T9 is connected with a first terminal of the tenth transistor T10.

A gate of the tenth transistor T10 is connected with the fifth signal terminal S5. A second terminal of the tenth transistor T10 is connected with the readout signal line RL.

The detection electrode D is connected with the one terminal of the second capacitor C2.

The other terminal of the second capacitor C2 is connected with the fifth signal terminal S5.

It should be noted that the fingerprint identification module 40 can further comprises a plurality of switch transistors connected with the eighth transistor T8 or the ninth transistor T9 in parallel. The above is only an example of the fingerprint identification module 40. Other structures with the same function as the fingerprint identification module 40 will not be repeated here anymore; however, they should all belong to the claimed scope of the present invention.

The compensation module 30 can comprise: a third transistor T3, a fourth transistor T4, a fifth transistor T5, a sixth transistor T6, a seventh transistor T7 and a first capacitor C1.

A gate of the third transistor T3 is connected with the third signal terminal S3. A first terminal of the third transistor T3 is connected with the data signal terminal Vdata. A second terminal of the third transistor T3 is connected with one terminal of the first capacitor C1.

A gate of the fourth transistor T4 is connected with the second signal terminal S2. A first terminal of the fourth transistor T4 is connected with the common voltage terminal Vcom. A second terminal of the fourth transistor T4 is connected with the one terminal of the first capacitor C1.

A gate of the fifth transistor T5 is connected with the first signal terminal S1. A first terminal of the fifth transistor T5 is connected with a first terminal of the seventh transistor T7.

A second terminal of the fifth transistor T5 is connected with the first voltage terminal V1 (grounding GND).

A gate of the sixth transistor T6 is connected with the second signal terminal S2. A first terminal of the sixth transistor T6 is connected with the display driving module 10. A second terminal of the sixth transistor T6 is connected with the common voltage terminal Vcom. When the structure of the display driving module 10 is as stated above, the first terminal of the sixth transistor T6 is connected with the second terminal of the driving transistor Td.

A gate of the seventh transistor T7 is connected with the second signal terminal S2. A first terminal of the seventh transistor T7 is connected with the other terminal of the first capacitor C1. A second terminal of the seventh transistor T7 is connected with the display driving module 10. When the structure of the display driving module 10 is as stated above, the second terminal of the seventh transistor T7 is connected with the first terminal of the driving transistor Td.

It should be noted that the compensation module 30 can further comprise a plurality of switch transistors connected with the third transistor T3, the fourth transistor T4, the fifth transistor T5, the sixth transistor T6 or the seventh transistor T7 in parallel. The above is only an example of the compensation module 30. Other structures with the same function as the compensation module 30 will not be repeated here anymore; however, they should all belong to the claimed scope of the present invention.

In addition, the present invention does not make definitions to the first terminal and the second terminal of transistors (all are switch transistors) other than the driving transistor Td. The first terminal can be the drain, and the second can be the source. Or the first terminal can be the source, and the second terminal can be the drain. When the driving transistor Td is a P-type transistor, because the source voltage of the P-type transistor is higher than the drain voltage, the first terminal of the driving transistor Td is the source, and the second terminal is the drain. When the driving transistor Td is an N-type transistor, it is exactly contrary to the P-type transistor.

Figure 3:
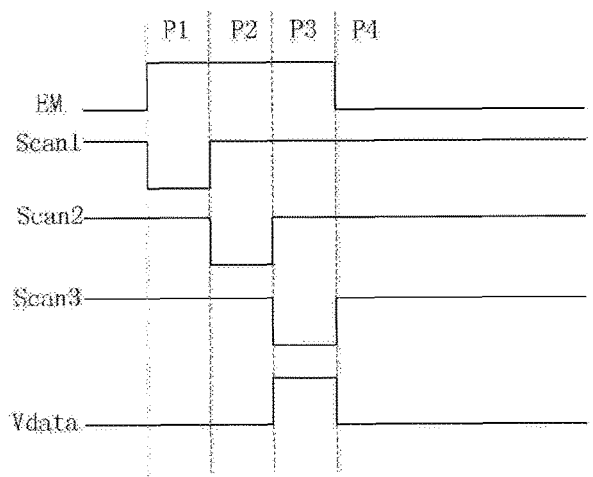
FIG. 3 is a timing diagram of respective control signals in the working process of the pixel circuit as shown in FIG. 1.

When all the transistors in FIG. 2 are P-type transistors, the working process of the pixel circuit as shown in FIG. 2 will be described in detail combined with the timing diagram as shown in FIG. 3.

Figure 4A:
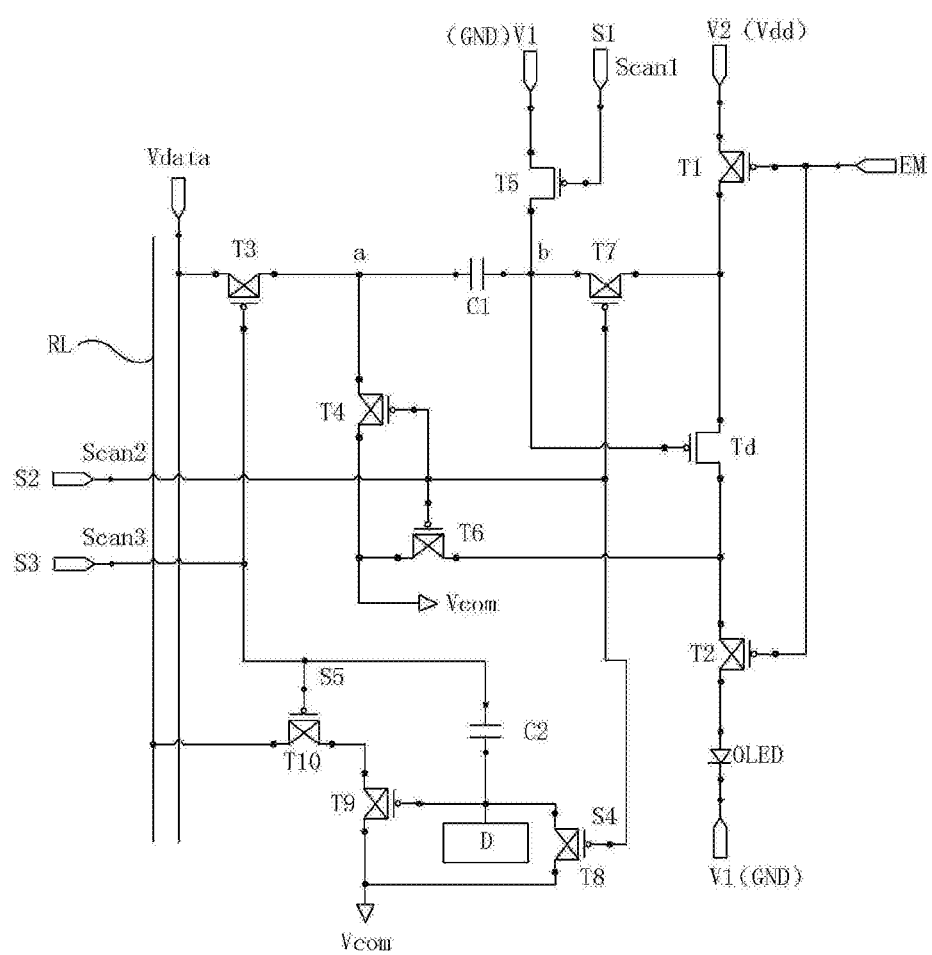
FIG. 4*a* to FIG. 4*d* are equivalent circuit diagrams of the pixel circuit shown in FIG. 2, each of which corresponds to phases of P1-P4 in FIG. 3 respectively.

At the first phase P1, an equivalent circuit diagram of the pixel circuit as shown in FIG. 2 is shown in FIG. 4a. In the equivalent circuit diagram provided by embodiments of the present invention, the transistor in the cut-off state is represented by "X".

The first scanning signal line Scan1 inputs a signal to the first signal terminal S1 to turn on the fifth transistor T5. A voltage of the first voltage terminal V1 (grounding GND) resets the gate of the driving transistor TD through the fifth transistor T5. Consequently, the voltage that remains at the gate of the driving transistor Td (node b) in the process of displaying the previous frame of image will be released, so as to avoid the residual voltage from influencing the display of the current frame of image.

Figure 4B:
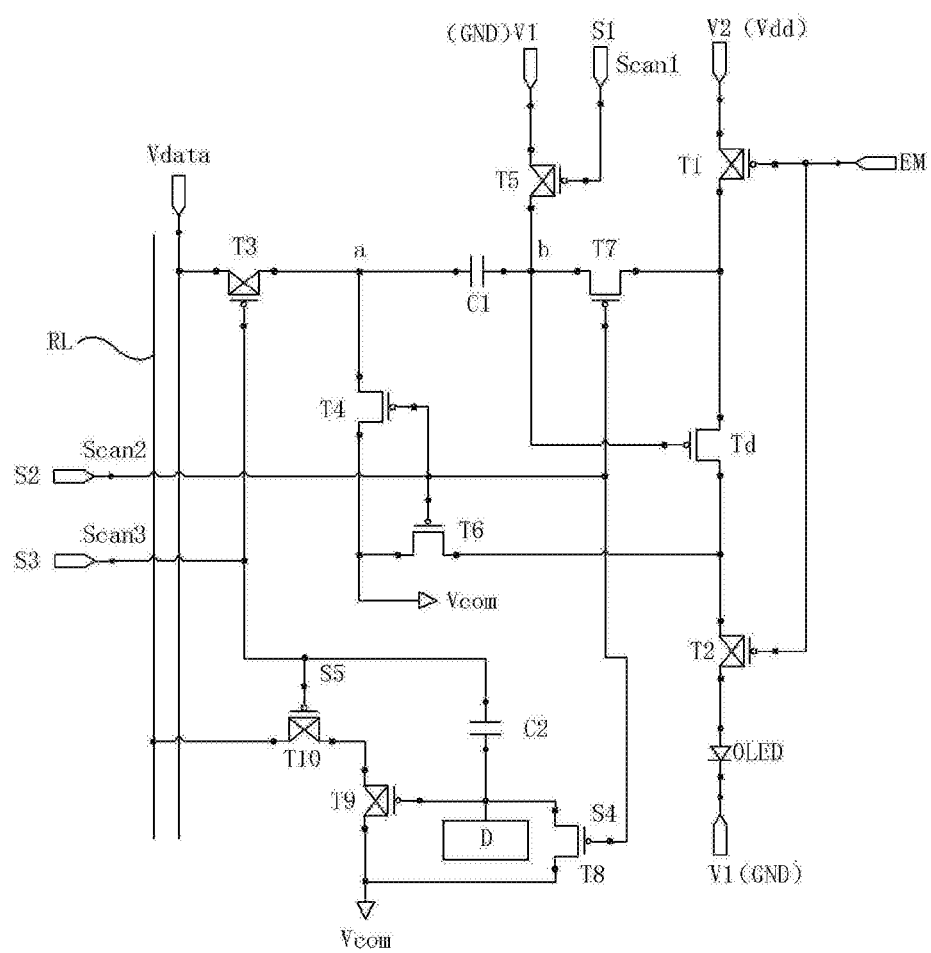

At the second phase P2, an equivalent circuit diagram is shown in FIG. 4b. The second signal terminal S2 of the compensation module 30 and the fourth signal terminal S4 of the fingerprint identification module 40 are connected with the same signal line, i.e., the second scanning signal line Scan2.

On the one hand, the second scanning signal line Scan2 inputs a signal to the second signal terminal S2 to turn on the fourth transistor T4, the sixth transistor T6 and the seventh transistor T7. An input signal of the common voltage terminal Vcom charges the first capacitor C1. The first transistor T1, the second transistor T2, the third transistor T3, and the fifth transistor T5 are in the cut-off state.

Because the gate (node b) of the driving transistor Td is connected to the grounding terminal GND (i.e., the first voltage terminal) at the previous phase, the driving transistor Td is in the turn-on state. Here, the signal inputted by the common voltage terminal reversely charges the node b through the sixth transistor T6, the driving transistor Td and the seventh transistor T7, until the voltage of the node b is Vg=Vcom−|Vth |, so as to meet the condition that the voltage difference between the source and the drain of the driving transistor Td is the threshold voltage Vth of the driving transistor Td. Because the driving transistor Td is a P-type transistor, the threshold voltage is a negative value, so the calculation has to be made with the absolute value of the threshold voltage Vth when calculating the voltage Vg of the node b. In addition, because the fourth transistor T4 is in the turn-on state, the potential of the node a is Va=Vcom.

On the other hand, the second scanning signal line Scan2 inputs a signal to the fourth signal terminal S4 to turn on the eighth transistor T8. The second capacitor C2 is discharged through the eighth transistor T8, so as to reset the fingerprint identification module 40.

Figure 5A:
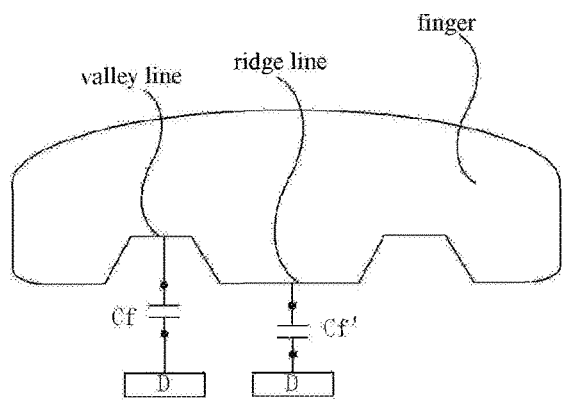
FIG. 5*a* is a schematic view of forming a capacitance between a ridge line or a valley line of a fingerprint and the detection electrode respectively in the working process of the fingerprint identification module.
Figure 5B:
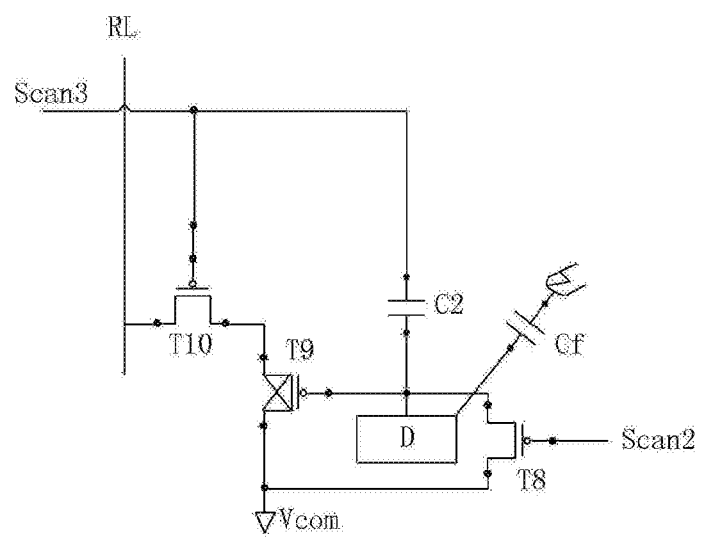
FIG. 5*b* is a diagram of principles of collecting fingerprint information by the fingerprint identification module when the valley line of the fingerprint in FIG. 5*a* is in contact with the screen.

Here, if the finger of a person is in contact with the display screen, in the touch control process, as shown in FIG. 5a, a coupling capacitance Cf is formed between the valley line of the fingerprint and the detection electrode D. The coupling capacitance Cf is small enough relative to the second capacitor C2 and the coupling capacitance Ct of the ninth transistor T9 itself as an amplifier transistor. In this way, as shown in FIG. 5b, the gate potential of the ninth transistor T9 will be increased. Because the ninth transistor T9 is a P-type transistor, the ninth transistor T9 will be in the cut-off state. The second terminal of the ninth transistor T9 is an initial current signal.

Figure 5C:
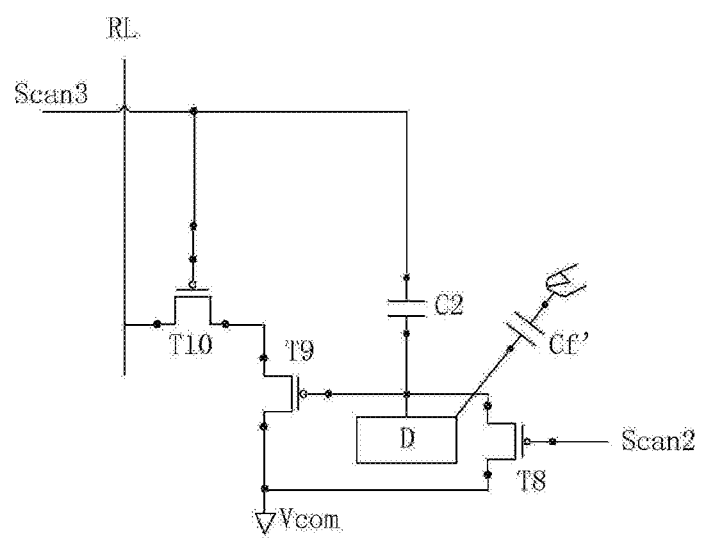
FIG. 5*c* is a diagram of principles of collecting fingerprint information by the fingerprint identification module when the ridge line of the fingerprint in FIG. 5*a* is in contact with the screen.

Or, in the touch control process, as shown in FIG. 5a, a coupling capacitance Cf is formed between the ridge line of the fingerprint and the detection electrode D. The coupling capacitance Cf is large enough relative to the second capacitor C2 and the coupling capacitance Ct of the ninth transistor T9 itself as an amplifier transistor. In this way, as shown in FIG. 5c, the gate potential of the ninth transistor T9 will be reduced. Because the ninth transistor T9 is a P-type transistor, the ninth transistor T9 will be in the turn-on state. The ninth transistor T9 will amplify the signal of the common voltage terminal Vcom.

To sum up, the fingerprint identification module 40 accomplishes collection of the fingerprint information. The fingerprint information is related to the valley line and the ridge line of the fingerprint. When the second terminal of the ninth transistor T9 is the initial current signal, the collected fingerprint information is the valley line of the fingerprint. When the second terminal of the ninth transistor T9 is the amplified signal, the collected fingerprint information is the ridge line of the fingerprint.

Figure 4C:
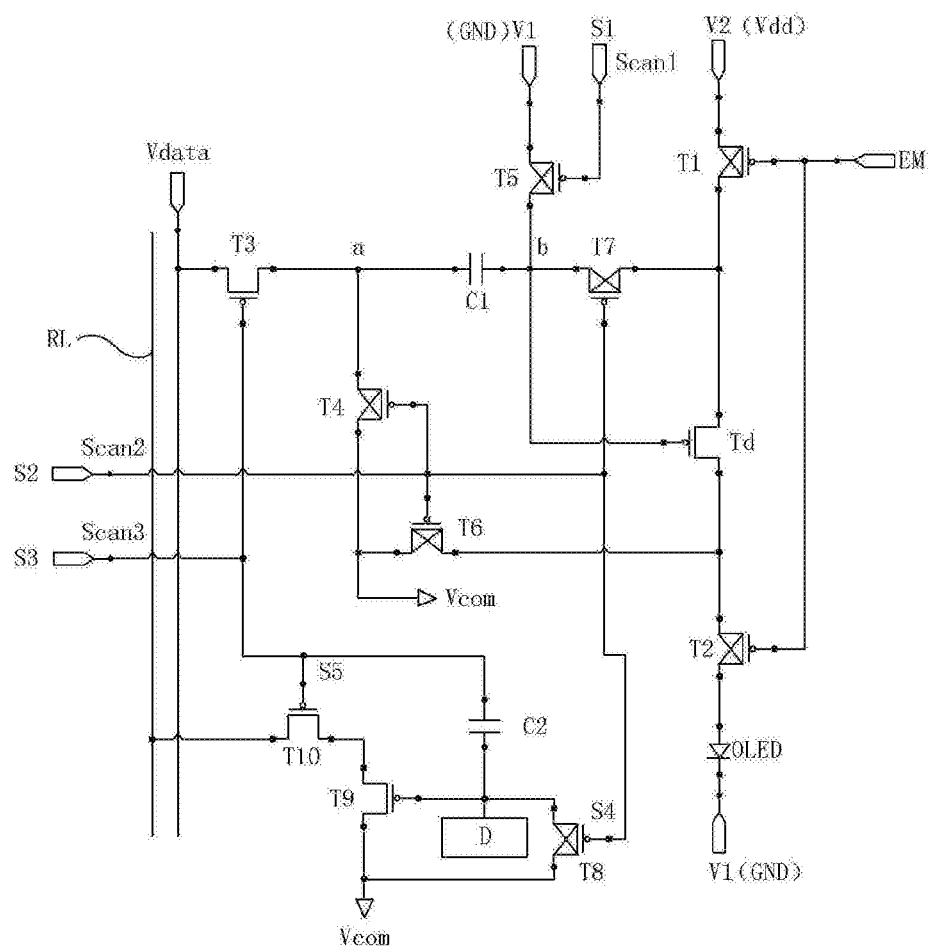

At the third phase P3, an equivalent circuit diagram is shown in FIG. 4c. The third signal terminal S3 of the compensation module 30 and the fifth signal terminal S5 of the fingerprint identification module 40 are connected with the same signal line, i.e., the third scanning signal line Scan3.

On the one hand, the third scanning signal line Scan3 inputs a signal to the third signal terminal S3 to turn on the third transistor T3. A signal inputted by the data voltage terminal Vdata is outputted to one terminal of the first capacitor C1. A voltage of the other terminal of the first capacitor C1. i.e., a voltage of node b, jumps due to a bootstrap function of the first capacitor C1, so as to enable a gate voltage of the driving transistor Td to jump. Specifically, at this phase, because the voltage of the node a is Va=Vdata, in order to enable the voltages at two terminals of the first capacitor C1 to keep at Vcom−Vth, the voltage (i.e., the gate voltage of the driving transistor Td) of the node b Vg has to jump to Vdata−Vth and remain constant.

On the other hand, the third scanning signal line Scan3 inputs a signal to the fifth signal terminal S5 to turn on the tenth transistor T10.

When the tenth transistor T10 is turned on, and when the ninth transistor T9 as shown in FIG. 5b is in the cut-off state, the initial current signal of the second terminal of the ninth transistor will be transmitted to the readout signal line RL through the tenth transistor T10, so as to enable the signal receiving device to receive the signal on the readout signal line RL. Because what the receiving device receives is the initial current signal collected by the readout signal line RL, it can be determined that it is the valley line of the fingerprint that is in contact with this pixel area.

When the ninth transistor T9 as shown in FIG. 5c is in the turn-on state, the ninth transistor will amplify the signal of the common voltage terminal Vcom and transmit it to the readout signal line RL through the tenth transistor T10, so as to enable the signal receiving device to receive the signal on the readout signal line RL. Because what the receiving device receives is the amplified signal collected by the readout signal line RL, it can be determined that it is the ridge line of the fingerprint that is in contact with this pixel area.

The third scanning signal line Scan3 is the horizontal coordinates of the pixel unit to which the above fingerprint information (the ridge line or the valley line) corresponds. The readout signal line RL is the longitudinal coordinates of the pixel unit to which the above fingerprint information (the ridge line or the valley line) corresponds. It can be determined from the above coordinates the specific position of the fingerprint information corresponding to the display panel, so as to display on the display screen the fingerprint information matching with the specific position, thereby achieving the object of fingerprint identification.

Figure 4D:
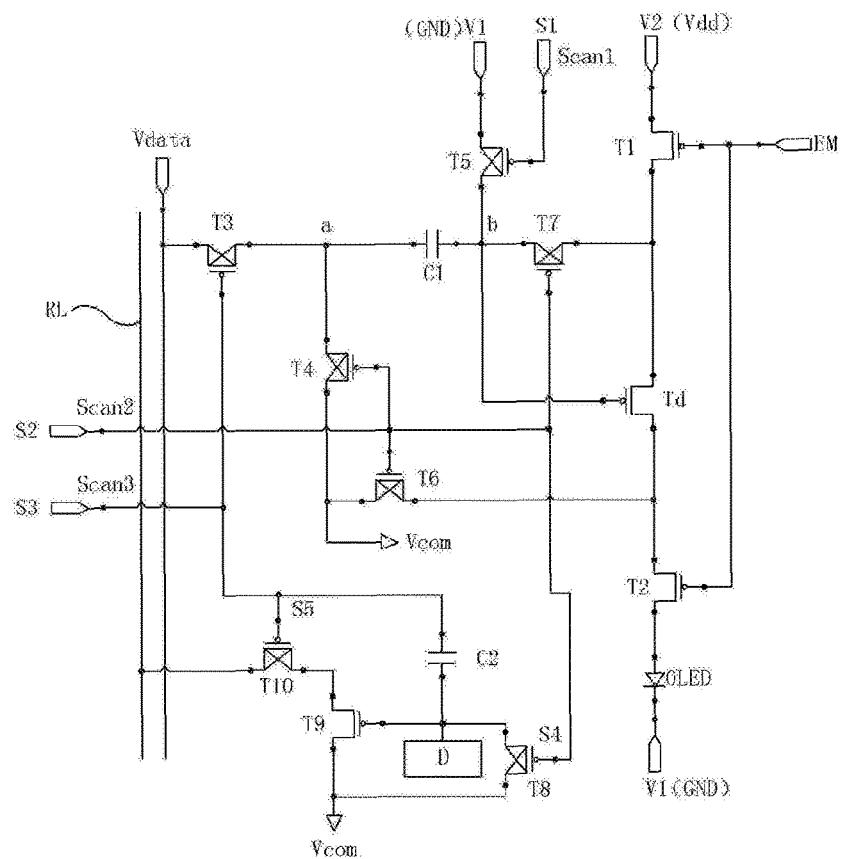

At the fourth phase P4, an equivalent circuit diagram is shown in FIG. 4d. The enable signal terminal EM inputs a signal to turn on the first transistor T1 and the second transistor T2. A current that flows through the first transistor T1, the driving transistor Td and the second transistor T2 drives the light emitting device to emit light.

Specifically, it can be derived from the saturation current formula of the driving transistor Td that:

$$I_{OLED} = K(Vgs - |Vth|)^2$$
$$= K[V2 - (Vdata - |Vth|) - |Vth|]^2$$
$$= K(V2 - Vdata)^2$$

From the above formula it can be seen that the working current $I_{OLED}$ that flows through the light emitting device OLED has not been affected by the threshold voltage Vth, but is only related to the voltage inputted by the second voltage terminal V2 (i.e., the power supply voltage Vdd) and the voltage inputted by the data voltage terminal Vdata. Consequently, the problem of shifts of the threshold voltage Vth caused by the manufacture process and long time operations of the driving transistor Td can be solved thoroughly, so as to eliminate the influence of the shifts of the threshold voltage Vth on the working current $I_{OLED}$, ensure normal operations of the light emitting device OLED and improve brightness constancy of the display device.

Embodiment Two

In the structure of the pixel circuit provided by this embodiment, relative to Embodiment one, the specific structures of the display driving module 10 and the light emitting module 20 are the same as those in Embodiment one. The fingerprint identification module 40 also comprises an eighth transistor T8, a ninth transistor T9, a tenth transistor T10, a second capacitor C2 and a detection electrode D.

Figure 6:
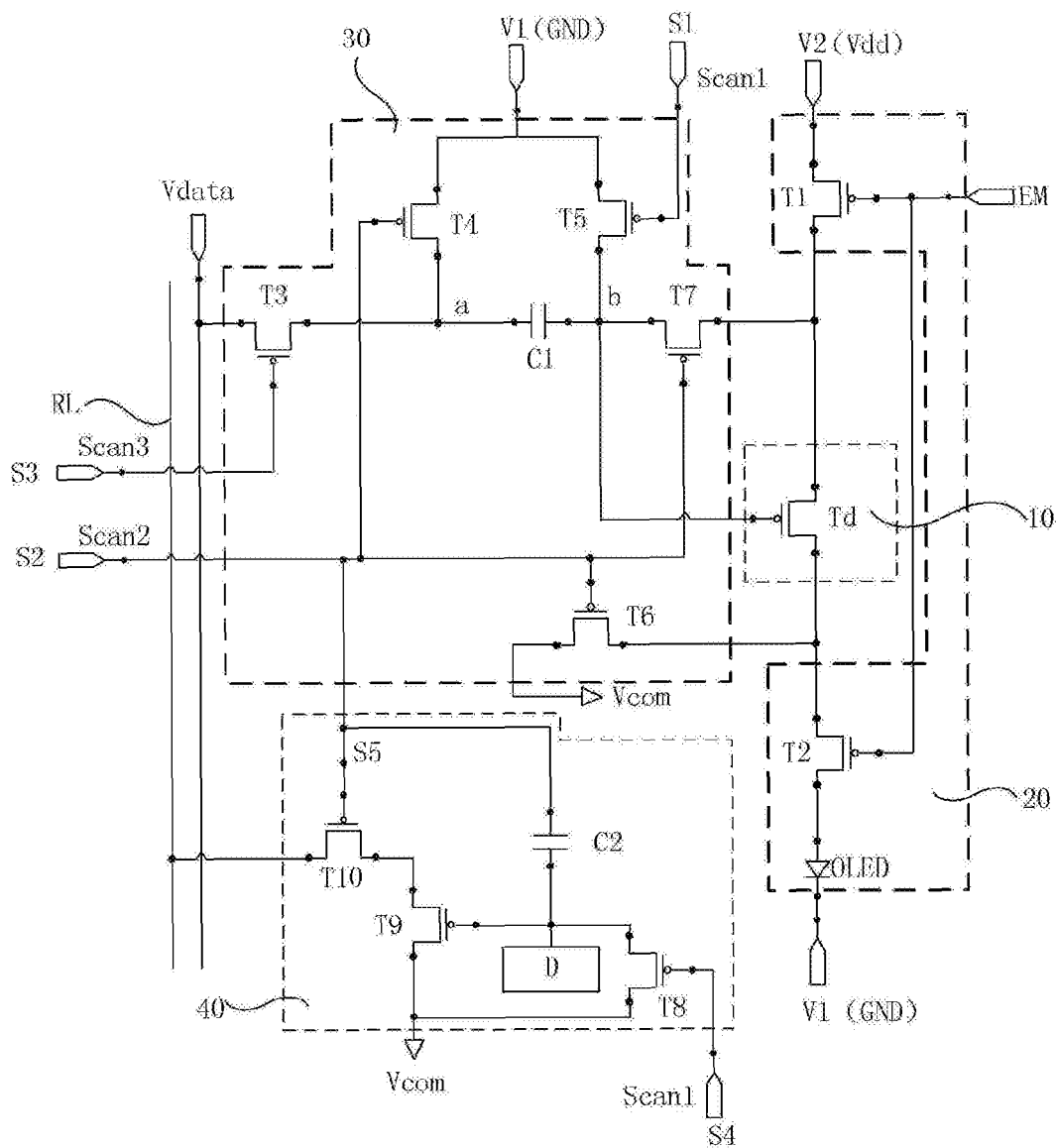
FIG. 6 is another specific structural schematic view of respective modules of the pixel circuit as shown in FIG. 1.

Different from Embodiment one, as shown in FIG. 6, in this embodiment, for example, the second signal terminal S2 of the compensation module 30 and the fifth signal terminal S5 of the fingerprint identification module 40 are connected with the same signal line, i.e., the second scanning signal line Scan2, and the first signal terminal S1 of the compensation module 30 and the fourth signal terminal S4 of the fingerprint identification module 40 are connected with the same signal line, i.e., the first scanning signal line Scan1, so as to achieve the object of multiplexing the second scanning signal line Scan2 and the first scanning signal line Scan1.

In addition, the specific structure of the compensation module 30 in this embodiment may comprise: a third transistor T3, a fourth transistor T4, a fifth transistor T5, a sixth transistor T6, a seventh transistor T7 and a first capacitor C1.

Specifically, a gate of the third transistor T3 is connected with the third signal terminal S3. A first terminal of the third transistor T3 is connected with the data signal terminal Vdata. A second terminal of the third transistor T3 is connected with one terminal of the first capacitor C1.

A gate of the fourth transistor T4 is connected with the second signal terminal S2, a first terminal of the fourth transistor T4 is connected with the first voltage terminal V1 (i.e., grounding GND). A second terminal of the fourth transistor T4 is connected with the one terminal of the first capacitor C1.

A gate of the fifth transistor T5 is connected with the first signal terminal S1. A first terminal of the fifth transistor T5 is connected with the other terminal of the first capacitor C1. A second terminal of the fifth transistor T5 is connected with the first voltage terminal V1.

A gate of the sixth transistor T6 is connected with the second signal terminal S2. A first terminal of the sixth transistor T6 is connected with the display driving module 10. A second terminal of the sixth transistor T6 is connected with the common voltage terminal Vcom. When the structure of the display driving module 10 is as stated above, the first terminal of the sixth transistor T6 is connected with the second terminal of the driving transistor Td.

A gate of the seventh transistor T7 is connected with the second signal terminal S2, a first terminal of the seventh transistor T7 is connected with the other terminal of the first capacitor C1. A second terminal of the seventh transistor T7 is connected with the display driving module 10. When the structure of the display driving module 10 is as stated above, the second terminal of the seventh transistor T7 is connected with the first terminal of the driving transistor Td.

When all the transistors in FIG. 6 are P-type transistors, the working process of the pixel circuit as shown in FIG. 6 will be described with reference to the timing diagram as shown in FIG. 3.

At the first phase P1, the first signal terminal S1 of the compensation module 30 and the fourth signal terminal S4 of the fingerprint identification module 40 are connected with the same signal line, i.e., the first scanning signal line Scan1.

On the one hand, the first scanning signal line Scan1 inputs a signal to the first signal terminal S1 to turn on the fifth transistor T5. A voltage of the first voltage terminal V1 resets the gate of the driving transistor Td through the fifth transistor voltage T5.

On the other hand, the first scanning signal line Scan1 inputs a signal to the fourth signal terminal S4 to turn on the eighth transistor T8. The second capacitor C2 is reset through the eighth transistor.

To sum up, relative to Embodiment one, this embodiment resets the compensation module 30 and the fingerprint identification module 40 simultaneously at the first phase P1.

At the second phase P2, the second signal terminal S2 of the compensation module 30 and the fifth signal terminal S5 of the fingerprint identification module 40 are connected with the same signal line, i.e., the second scanning signal line Scan2.

On the one hand, the second scanning signal line Scan2 inputs a signal to the second signal terminal S2 to turn on the fourth transistor T4, the sixth transistor T6 and the seventh transistor T7. An input signal of the first voltage terminal V1 charges the first capacitor C1. The first transistor T1, the second transistor T2, the third transistor T3, and the fifth transistor T5 are cut off.

On the other hand, when a finger is in contact with the screen, a coupling capacitance Cf is formed between the valley line of the fingerprint and the detection electrode D, so as to enable the ninth transistor to be in a cut-off state. Or, in the touch control process, a coupling capacitance Cf is formed between the ridge line of the fingerprint and the detection electrode D so as to enable the ninth transistor to be in a turn-on state.

Here, the second scanning signal line Scan2 inputs a signal to the fifth signal terminal S5 to turn on the tenth transistor T10. When the ninth transistor T9 is in the cut-off state, an initial current signal of the second terminal of the ninth transistor T9 is transmitted to the readout signal line RL through the tenth transistor T10. When the ninth transistor T9 is in the turn-on state, the ninth transistor T9 amplifies the signal inputted by the common voltage terminal Vcom and transmits it to the readout signal line RL through the tenth transistor T10.

The principles of the collecting and transmitting processes of the fingerprint information by the fingerprint identification module 40 are the same as that of Embodiment one, which will not be repeated here. The difference from Embodiment one is that the collection and transmission of the fingerprint information by the fingerprint identification module 40 in this embodiment are performed simultaneously at the second phase P2.

At the third phase P3, the third scanning signal line Scan3 inputs a signal to the third signal terminal S3 to turn on the third transistor T3. A signal inputted by the data voltage terminal Vdata is outputted to one terminal of the first capacitor C1. A voltage of the other terminal of the first capacitor C1 jumps due to a bootstrap function of the first capacitor C1, so as to enable a gate voltage of the driving transistor Td to jump. The specific jumping process is similar as the jumping process of the node b in the third phase P3 of Embodiment one, which will not be repeated here specifically.

At the fourth phase P4, the enable signal terminal EM inputs a signal to turn on the first transistor T1 and the second transistor T2. A current that flows through the first transistor T1, the driving transistor Td and the second transistor T2 drives the light emitting device to emit light. The specific light emitting process is similar as Embodiment one, which will not be repeated here.

Embodiment Three

In the structure of the pixel circuit provided by this embodiment, relative to Embodiment one, the specific structures of the display driving module 10 and the light emitting module 20 are the same as those in Embodiment one. The fingerprint identification module 40 also comprises an eighth transistor T8, a ninth transistor T9, a tenth transistor T10, a second capacitor C2 and a detection electrode D.

Figure 7:
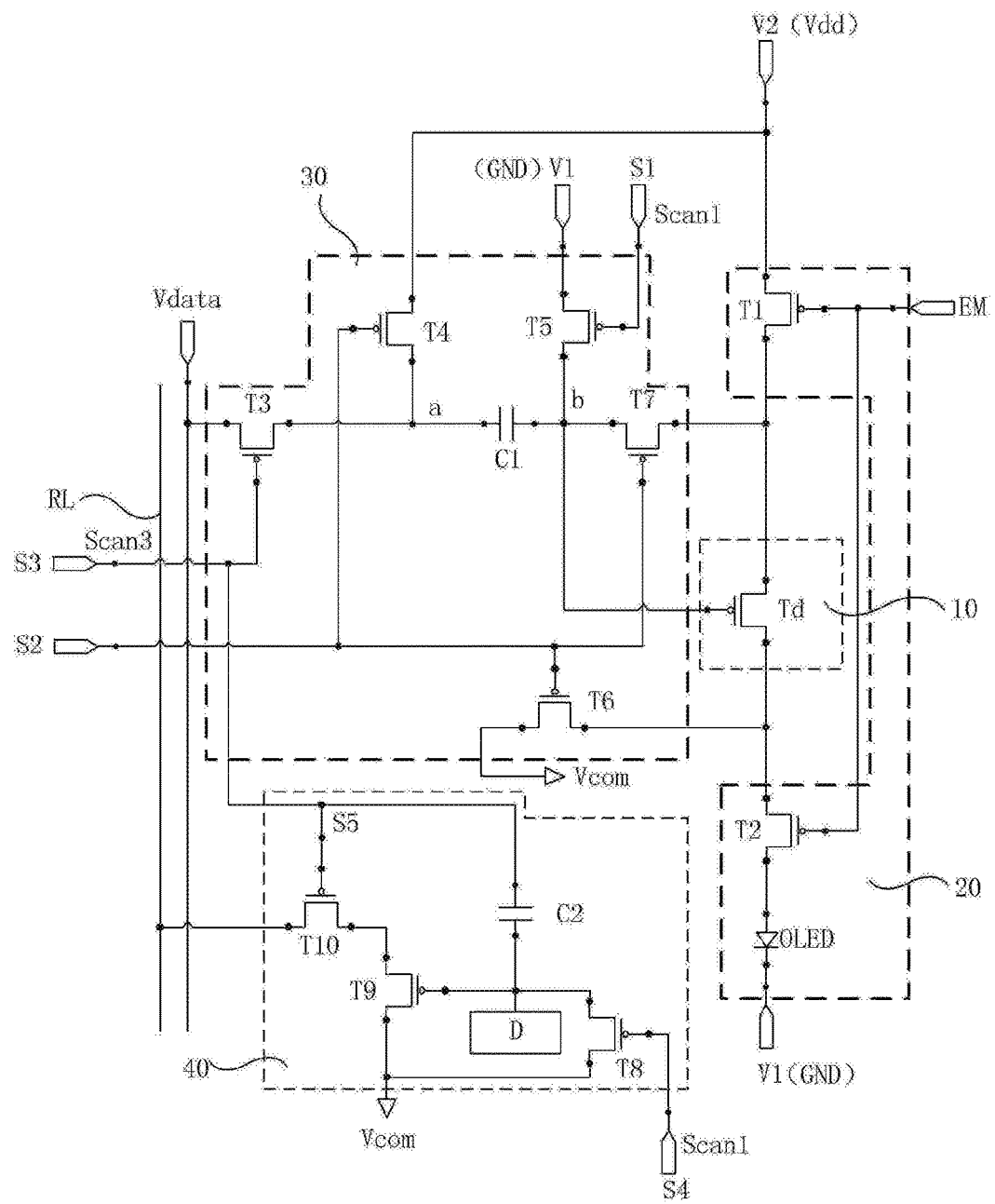
FIG. 7 is a further specific structural schematic view of respective modules of the pixel circuit as shown in FIG. 1.

The difference is that, as shown in FIG. 7, in this embodiment, for example, the third signal terminal S3 of the compensation module 30 and the fifth signal terminal S5 of the fingerprint identification module 40 are connected with the same signal line, i.e., the third scanning signal line Scan3, and the first signal terminal S1 of the compensation module 30 and the fourth signal terminal S4 of the fingerprint identification module 40 are connected with the same signal line, i.e., the first scanning signal line Scan1, so as to achieve the object of multiplexing the third scanning signal line Scan3 and the first scanning signal line Scan1.

In addition, the specific structure of the compensation module 30 in this embodiment may comprise: a third transistor T3, a fourth transistor T4, a fifth transistor T5, a sixth transistor T6, a seventh transistor T7 and a first capacitor C1.

Specifically, a gate of the third transistor T3 is connected with the third signal terminal S3. A first terminal of the third transistor T3 is connected with the data signal terminal Vdata. A second terminal of the third transistor T3 is connected with one terminal of the first capacitor C1.

A gate of the fourth transistor T4 is connected with the second signal terminal S2. A first terminal of the fourth transistor T4 is connected with the second voltage terminal V2. A second terminal of the fourth transistor T4 is connected with the one terminal of the first capacitor C1.

A gate of the fifth transistor T5 is connected with the first signal terminal S1. A first terminal of the fifth transistor T5 is connected with the other terminal of the first capacitor C1. A second terminal of the fifth transistor T5 is connected with the first voltage terminal V1.

A gate of the sixth transistor T6 is connected with the second signal terminal S2. A first terminal of the sixth transistor T6 is connected with the display driving module 10. A second terminal of the sixth transistor T6 is connected with the common voltage terminal Vcom. When the structure of the display driving module 10 is as stated above, the first terminal of the sixth transistor T6 is connected with the second terminal of the driving transistor Td.

A gate of the seventh transistor T7 is connected with the second signal terminal S2. A first terminal of the seventh transistor T7 is connected with the other terminal of the first capacitor C2. A second terminal of the seventh transistor T7 is connected with the display driving module 10. When the structure of the display driving module 10 is as stated above, the second terminal of the seventh transistor T7 is connected with the first terminal of the driving transistor Td.

When all the transistors in FIG. 7 are P-type transistors, the working process of the pixel circuit as shown in FIG. 7 will be described with reference to the timing diagram as shown in FIG. 3.

At the first phase P1, the first signal terminal S1 of the compensation module 30 and the fourth signal terminal S4 of the fingerprint identification module 40 are connected with the same signal line, i.e., the first scanning signal line Scan1.

On the one hand, the first scanning signal line Scan1 inputs a signal to the first signal terminal S1 to turn on the fifth transistor T5. A voltage of the first voltage terminal V1 resets the gate of the driving transistor Td through the fifth transistor voltage T5.

On the other hand, the first scanning signal line Scan1 inputs a signal to the fourth signal terminal S4 to turn on the eighth transistor T8. The second capacitor C2 is reset through the eighth transistor T8.

To sum up, relative to Embodiment one, this embodiment resets the compensation module 30 and the fingerprint identification module 40 simultaneously at the first phase P1.

At the second phase P2, the second scanning signal line Scan2 inputs a signal to the second signal terminal S2 to turn on the fourth transistor T4, the sixth transistor T6 and the seventh transistor T7. An input signal of the second voltage terminal V2 charges the first capacitor C1. The first transistor T1, the second transistor T2, the third transistor T3, and the fifth transistor T5 are cut off.

When a finger is in contact with the screen, a coupling capacitance Cf is formed between the valley line of the fingerprint and the detection electrode D, so as to enable the ninth transistor to be in a cut-off state. Or, in the touch control process, a coupling capacitance Cf' is formed between the ridge line of the fingerprint and the detection electrode D so as to enable the ninth transistor to be in a turn-on state. The principle of the collecting process of the fingerprint information by the fingerprint identification module 40 is the same as Embodiment one, which will not be repeated here.

At the third phase P3, the third signal terminal S3 of the compensation module 30 and the fifth signal terminal S5 of the fingerprint identification module 40 are connected with the same signal line, i.e., the third scanning signal line Scan3.

On the one hand, the third scanning signal line Scan3 inputs a signal to the third signal terminal S3 to turn on the third transistor T3. A signal inputted by the data voltage terminal Vdata is outputted to one terminal of the first capacitor C1. A voltage of the other terminal of the first capacitor C1 jumps due to a bootstrap function of the first capacitor C1, so as to enable a gate voltage of the driving transistor Td to jump. The specific jumping process is similar as the jumping process of the node b in the third phase P3 of Embodiment one, which will not be repeated here specifically.

On the other hand, the third scanning signal line Scan3 inputs a signal to the fifth signal terminal S5 to turn on the tenth transistor T10. When the ninth transistor T9 is in the cut-off state, an initial current signal of the second terminal of the ninth transistor T9 is transmitted to the readout signal line RL through the tenth transistor T10. When the ninth transistor T9 is in the turn-on state, the ninth transistor T9 amplifies a signal inputted by the common voltage terminal Vcom, and transmits it to the readout signal line RL through the tenth transistor T10. The principle of the transmitting process of the fingerprint information by the fingerprint identification module 40 is the same as Embodiment one, which will not be repeated here.

At the phase of P4, the enable signal terminal EM inputs a signal to turn on the first transistor T1 and the second transistor T2. A current that flows through the first transistor T1, the driving transistor Td and the second transistor T2 drives the light emitting device to emit light. The specific light emitting process is similar as Embodiment one, which will not be repeated here.

It should be noted that in all of the above embodiments of the present invention, for example, the transistors in the pixel circuit are all P-type transistors. When the above transistors are all N-type transistor, the timing signals in FIG. 3 have to be reversed, while the working principle thereof is the same as above, which will not be repeated here.

Figure 8:
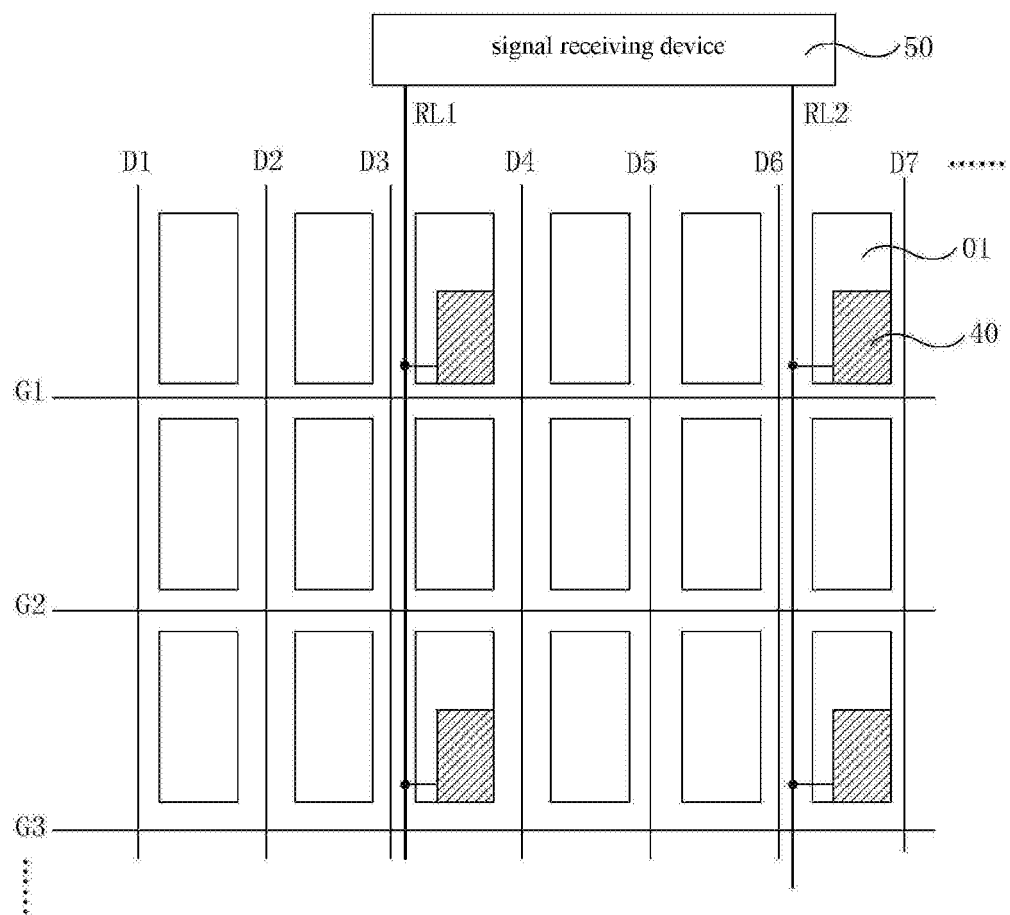
FIG. 8 is a structural schematic view of a display device provided by embodiments of the present invention.

Embodiments of the present invention provide a display device, comprising any pixel circuit as stated above, and a signal receiving device 50 (as shown in FIG. 8) connected with the readout signal line, for receiving the fingerprint information outputted by the readout signal line.

Specifically, the signal receiving device 50 can be connected with the fingerprint identification module 40 in the pixel circuit within the pixel unit 01 through the readout signal line, for example, the first readout signal line RL1 and the second readout signal line RL2 in FIG. 8. Next, the specific receiving process of the signal receiving device 50 will be explained.

When a finger of a person is in contact with the display screen, the fingerprint identification module 40 collects the fingerprint information. The fingerprint information is related to the valley line and the ridge line of the fingerprint. If the second terminal of the ninth transistor T9 is an initial current signal, the collected fingerprint information is the valley line of the fingerprint. When the tenth transistor T10 is turned on, if the ninth transistor T9, as shown in FIG. 5b, is in the cut-off state, the initial current signal of the second terminal of the ninth transistor will be transmitted to the readout signal line RL through tenth transistor T10. The signal receiving device 50 receives the initial current signal outputted by the readout signal line RL and identifies the signal so that the pixel unit displays the valley line of the fingerprint based on the coordinates of the collected fingerprint information.

When the finger of a person is in contact with the display screen, corresponding to collection of the fingerprint information by the fingerprint identification module 40, if the second terminal of the ninth transistor T9 is an amplified signal, the collected fingerprint information is the ridge line of the fingerprint. When the tenth transistor T10 is turned on, and if the ninth transistor T9, as shown in FIG. 5c, is in the turn-on state, the ninth transistor will amplify the signal of the common voltage terminal Vcom and transmit it to the readout signal line RL through the tenth transistor T10. The signal receiving device 50 receives the amplified signal outputted by the readout signal line RL and identifies the signal so that the pixel unit displays the ridge line of the fingerprint based on the coordinates of the collected fingerprint information.

The above are only examples of the signal receiving device 50, other structures with the same function of the signal receiving device 50 will not be repeated here one by one; however, they should all belong to the claimed scope of the present invention.

In addition, the above fingerprint identification module 40 can be arranged in the pixel circuit within each pixel unit 01. The above fingerprint identification module 40 can also be arranged in the pixel circuit within parts of the pixel units 01. For example, as shown in FIG. 8, in the first row of pixel units and the third row of pixel units, one fingerprint identification module 40 is arranged at intervals of every two pixel units. However, the fingerprint identification module 40 does not have to be arranged in the pixel circuits within the second row of pixel units 01. Certainly, the above are only examples of arrangements of the fingerprint identification module 40. Other arrangements will not be repeated here one by one; however, they should all belong to the claimed scope of the present invention.

The above display device has the same beneficial effect as the pixel circuit provided by the preceding embodiments of the present invention. Since the pixel circuit has been explained in detail in the preceding embodiments, it will not be repeated here.

Specifically, the display device provided by embodiments of the present invention can be a display device with a current driven light emitting device including an LED display or an OLED display.

Figure 9:
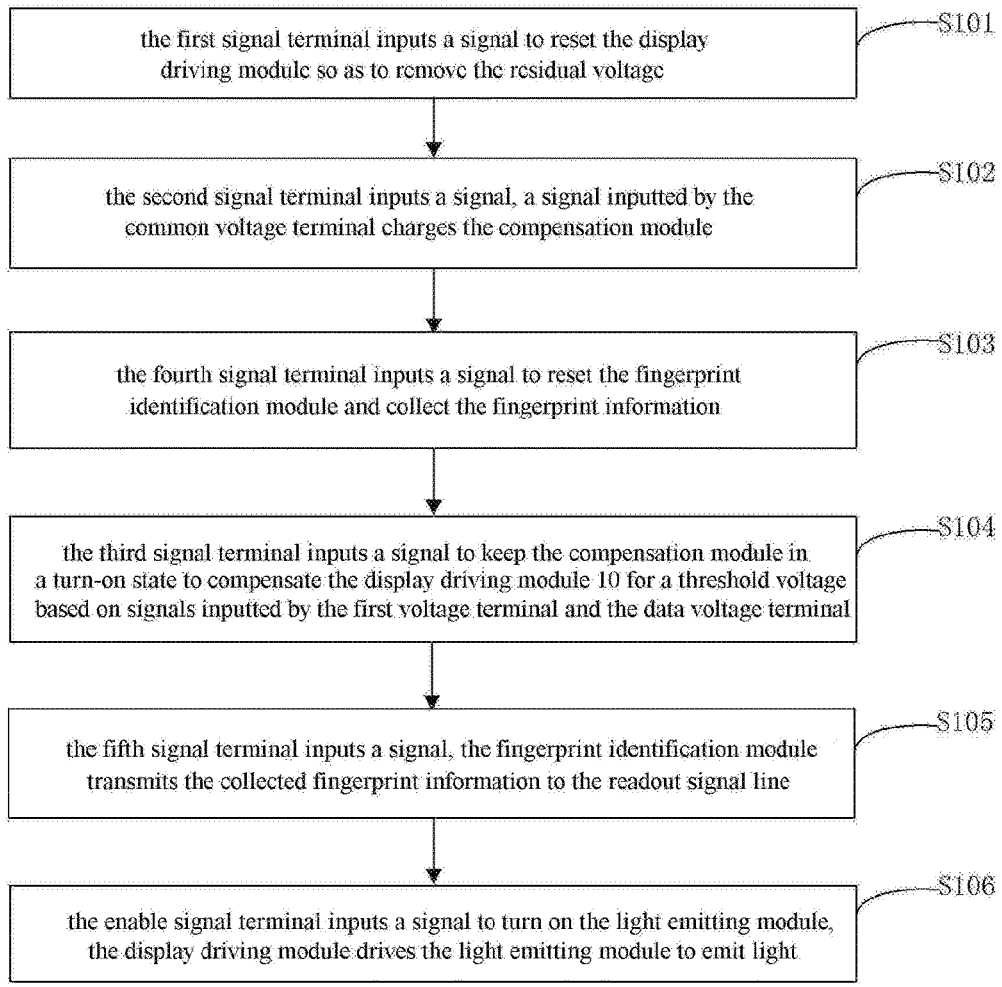
FIG. 9 is a flow chart of a driving method of a pixel circuit provided by embodiments of the present invention.

Embodiments of the present invention provide a method for driving a pixel circuit, for driving any pixel circuit as stated above. The method as shown in FIG. 9 may comprise:

Step S101: The first signal terminal S1 inputs a signal to reset the display driving module 10 so as to remove the residual voltage.

Step S102: The second signal terminal S2 inputs a signal. A signal inputted by the common voltage terminal Vcom charges the compensation module 30.

Step S103: The fourth signal terminal S4 inputs a signal to reset the fingerprint identification module 40 and collect the fingerprint information.

Step S104: The third signal terminal S3 inputs a signal to keep the compensation module 30 in a turn-on state tocompensate the display driving module 10 for a threshold voltage based on signals inputted by the first voltage terminal V1 and the data voltage terminal Vdata.

Step S105: The fifth signal terminal S5 inputs a signal. The fingerprint identification module 40 transmits the collected fingerprint information to the readout signal line RL.

Step S106: The enable signal terminal EM inputs a signal to turn on the light emitting module 20. The display driving module 10 drives the light emitting module 20 to emit light.

It should be noted that the above steps S101-5105 are not definitions to the time sequence of performing the method steps. For example, the step S101 and the step S102 or, the step S104 and the step S105 can be performed in the same time period.

Embodiments of the present invention provide a method for driving a pixel circuit, comprising: when a first signal terminal inputs a signal, resetting the display driving module to remove a residual voltage; when a second signal terminal inputs a signal, charging the compensation module through a signal inputted by a common voltage terminal; when a fourth signal terminal inputs a signal, resetting the fingerprint identification module and collecting fingerprint information; when a third signal terminal inputs a signal, keeping the compensation module in a turn-on state, and compensating the display driving module for a threshold voltage based on signals inputted by the first voltage terminal and the data signal terminal; when a fifth signal terminal inputs a signal, transmitting the collected fingerprint information to a readout signal line by the fingerprint identification module; when an enable signal terminal inputs a signal, turning on the light emitting module, and driving the light emitting module to emit light by the display driving module.

In this way, the same signal is inputted to the third signal terminal and the fifth signal terminal through the third scanning signal line. The same signal is inputted to the second signal terminal and the fourth signal terminal through the second scanning signal line. Or, the same signal is inputted to the second signal terminal and the fifth signal terminal through the second scanning signal line. The same signal is inputted to the first signal terminal and the fourth signal terminal through the first scanning signal line. Or, the same signal is inputted to the third signal terminal and the fifth signal terminal through the third scanning signal line. The same signal is inputted to the first signal terminal and the fourth signal terminal through the first scanning signal line. Because the first signal terminal, the second signal terminal, the third signal terminal and the compensation module are connected with each other, and the fourth signal terminal, the fifth signal terminal and the fingerprint module are connected with each other, on the one hand, under the control of the first scanning signal line, the second scanning signal line and the third scanning signal line, compensation for a threshold voltage can be made to the display driving module through the signals inputted by the first voltage terminal and the data signal terminal, so as to enable the display driving module, in the process of driving the light emitting module to emit light, to avoid the driving current from being influenced by shifts of the threshold voltage, thereby providing brightness constancy of the display. On the other hand, any two of the first scanning signal line, the second scanning signal line and the third scanning signal line can also, through the fourth signal terminal and the fifth signal terminal connected with the fingerprint identification module, control the fingerprint identification module to collect the fingerprint information and transmit the collected fingerprint information to the readout signal line, so as to achieve the object of fingerprint identification. Therefore, in the pixel circuit integrated with a compensation module and a fingerprint identification module provided by the present invention, the compensation module and the fingerprint identification module can be controlled simultaneously by multiplexing the first scanning signal line, the second scanning signal line and the third scanning signal line, so as to enable the display with the identification function to have a simple structure and improve the brightness constancy of the display through compensation for the threshold voltage.

Next, the method for driving the above pixel circuit will be described in detail through specific embodiments.

Embodiment Four

In the method for driving a pixel circuit provided by this embodiment, for example, the third signal terminal S3 of the compensation module 30 and the fifth signal terminal S5 of the fingerprint identification module 40 are connected with the same signal line, i.e., the third scanning signal line Scan3, and the second signal terminal S2 of the compensation module 30 and the fourth signal terminal S4 of the fingerprint identification module 40 are connected with the same signal line, i.e., the second scanning signal line Scan2, so as to achieve the object of multiplexing the third scanning signal line Scan3 and the second scanning signal line Scan2.

Figure 10:
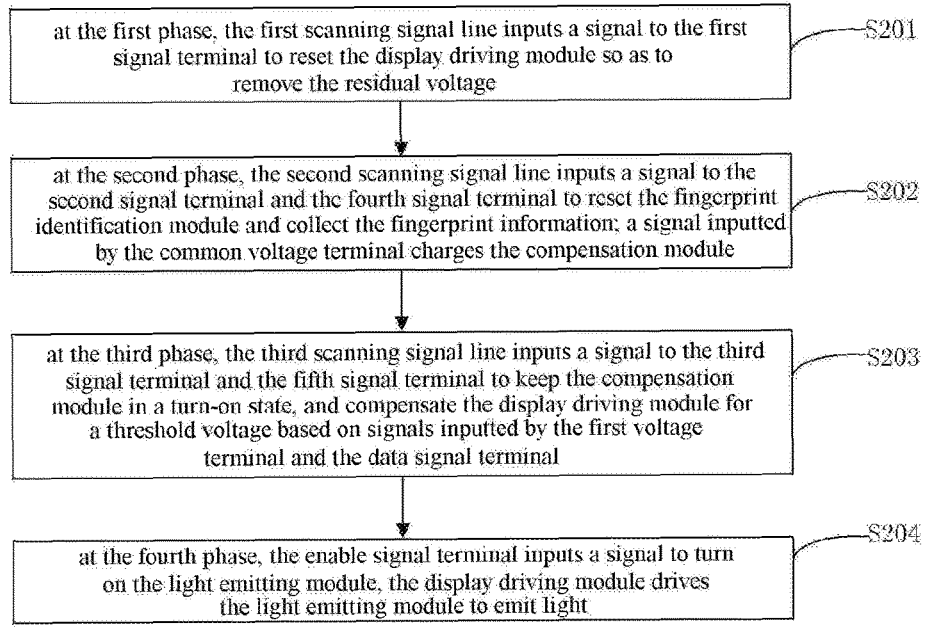
FIG. 10 is a flow chart of a driving method of the pixel circuit as shown in FIG. 2.

The method, as shown in FIG. 10, can comprise:

Step S201: at the first phase, the first scanning signal line Scan1 inputs a signal to the first signal terminal S1 to reset the display driving module so as to remove the residual voltage.

Specifically, the first scanning signal line Scan1 inputs a signal to the first signal terminal S1 to turn on the fifth transistor T5. A voltage of the first voltage terminal V1 (grounding GND) resets the gate of the driving transistor Td through the fifth transistor. Consequently, the voltage that remains at the gate of the driving transistor Td (node b) in the displaying process of the previous frame of image will be released, so as to avoid the residual voltage from influencing the display of the current frame of image.

Step S202: at the second phase, the second scanning signal line Scan2 inputs a signal to the second signal terminal S2 and the fourth signal terminal S4 to reset the fingerprint identification module 40 and collect the fingerprint information. A signal inputted by the common voltage terminal Vcom charges the compensation module 30.

Specifically, the second signal terminal S2 of the compensation module 30 and the fourth signal terminal S4 of the fingerprint identification module 40 are connected with the same signal line, i.e., the second scanning signal line Scan2.

On the one hand, the second scanning signal line Scan2 inputs a signal to the second signal terminal S2 to turn on the fourth transistor T4, the sixth transistor T6 and the seventh transistor T7. An input signal of the common voltage terminal Vcom charges the first capacitor C1. The first transistor T1, the second transistor T2, the third transistor T3, and the fifth transistor T5 are in the cut-off state.

Because the gate (node b) of the driving transistor Td is connected to the grounding terminal GND (i.e., the first voltage terminal) at the previous phase, the driving transistor Td is in the turn-on state. Here, the signal inputted by the common voltage terminal reversely charges the node b through the sixth transistor T6, the driving transistor Td and the seventh transistor T7, until the voltage of the node b is Vg=Vcom−|Vth|, so as to meet the condition that the voltage difference between the source and the drain of the driving transistor Td is the threshold voltage Vth of the driving transistor Td. Because the driving transistor Td is a P-type transistor, the threshold voltage is a negative value, so the calculation has to be made with the absolute value of the threshold voltage Vth when calculating the voltage Vg of the node b. In addition, because the fourth transistor T4 is in the turn-on state, the potential of the node a is Va=Vcom.

On the other hand, the second scanning signal line Scan2 inputs a signal to the fourth signal terminal S4 to turn on the eighth transistor T8. The second capacitor C2 is discharged through the eighth transistor T8, so as to reset the fingerprint identification module 40.

Here, if a finger of a person is in contact with the display screen, in the touch control process, as shown in FIG. 5a, a coupling capacitance Cf is formed between the valley line of the fingerprint and the detection electrode D. The coupling capacitance Cf is small enough relative to the second capacitor C2 and the coupling capacitance Ct of the ninth transistor T9 itself as an amplifier transistor. In this way, as shown in FIG. 5b, the gate potential of the ninth transistor T9 will be increased. Because the ninth transistor T9 is a P-type transistor, the ninth transistor T9 will be in the cut-off state. The second terminal of the ninth transistor T9 is an initial current signal.

Or, in the touch control process, as shown in FIG. 5a, a coupling capacitance Cf is formed between the ridge line of the fingerprint and the detection electrode D. The coupling capacitance Cf is large enough relative to the second capacitor C2 and the coupling capacitance Ct of the ninth transistor T9 itself as the amplifier transistor. In this way, as shown in FIG. 5c, the gate potential of the ninth transistor T9 will be reduced. Because the ninth transistor T9 is a P-type transistor, the ninth transistor T9 will be in the turn-on state. The ninth transistor T9 will amplify the signal of the common voltage terminal Vcom.

To sum up, the fingerprint identification module 40 accomplishes collection of the fingerprint information. The fingerprint information is related to the valley line and the ridge line of the fingerprint. When the second terminal of the ninth transistor T9 is the initial current signal, the collected fingerprint information is the valley line of the fingerprint.

When the second terminal of the ninth transistor T9 is the amplified signal, the collected fingerprint information is the ridge line of the fingerprint.

Step S203: at the third phase, the third scanning signal line Scan3 inputs a signal to the third signal terminal S3 and the fifth signal terminal S5 to keep the compensation module 30 in a turn-on state, and compensate the display driving module 10 for a threshold voltage based on signals inputted by the first voltage terminal V1 and the data signal terminal Vdata.

The fingerprint identification module 40 transmits the collected fingerprint information to the readout signal line RL.

Specifically, the third signal terminal S3 of the compensation module 30 and the fifth signal terminal S5 of the fingerprint identification module 40 are connected with the same signal line, i.e., the third scanning signal line Scan3.

On the one hand, the third scanning signal line Scan3 inputs a signal to the third signal terminal S3 to turn on the third transistor T3. A signal inputted by the data voltage terminal Vdata is outputted to one terminal of the first capacitor C1. A voltage of the other terminal of the first capacitor C1, i.e., a voltage of node b, jumps due to a bootstrap function of the first capacitor C1, so as to enable a gate voltage of the driving transistor Td to jump. Specifically, at this phase, because the voltage of the node a is Va=Vdata, in order to enable the voltages at two terminals of the first capacitor C1 to keep at Vcom−Vth, the voltage (i.e., the gate voltage of the driving transistor Td) of the node b Vg has to jump to Vdata−Vth and remain constant.

On the other hand, the third scanning signal line Scan3 inputs a signal to the fifth signal terminal S5 to turn on the tenth transistor T10.

When the tenth transistor T10 is turned on, and when the ninth transistor T9 as shown in FIG. 5b is in the cut-off state, the initial current signal of the second terminal of the ninth transistor will be transmitted to the readout signal line RL through the tenth transistor T10, so as to enable the signal receiving device to receive the signal on the readout signal line RL. Because what the receiving device receives is the initial current signal collected by the readout signal line RL, it can be determined that it is the valley line of the fingerprint that is in contact with this pixel area.

When the ninth transistor T9 as shown in FIG. 5c is in the turn-on state, the ninth transistor will amplify the signal of the common voltage terminal Vcom and transmit it to the readout signal line RL through the tenth transistor T10, so as to enable the signal receiving device to receive the signal on the readout signal line RL. Because what the receiving device receives is the amplified signal collected by the readout signal line RL, it can be determined that it is the ridge line of the fingerprint that is in contact with this pixel area.

The third scanning signal line Scan3 is the horizontal coordinates of the pixel unit to which the above fingerprint information (the ridge line or the valley line) corresponds. The readout signal line RL is the longitudinal coordinates of the pixel unit to which the above fingerprint information (the ridge line or the valley line) corresponds. It can be determined from the above coordinates the specific position of the fingerprint information corresponding to the display panel, so as to display on the display screen the fingerprint information matching with the specific position, thereby achieving the object of fingerprint identification.

Step S204: At the fourth phase P4, the enable signal terminal EM inputs a signal to turn on the light emitting module 20. The display driving module 10 drives the light emitting module 20 to emit light.

Specifically, the enable signal terminal EM inputs a signal to turn on the first transistor T1 and the second transistor T2. A current that flows through the first transistor T1, the driving transistor Td and the second transistor T2 drives the light emitting device to emit light.

Specifically, it can be derived from the saturation current formula of the driving transistor Td that:

$$I_{OLED} = K(Vgs - |Vth|)^2$$
$$= K[V2 - (Vdata - |Vth|) - |Vth|]^2$$
$$= K(V2 - Vdata)^2$$

From the above formula it can be seen that the working current $I_{OLED}$ that flows through the light emitting device OLED has not been affected by the threshold voltage Vth, but is only related to the voltage inputted by the second voltage terminal V2 (i.e., the power supply voltage Vdd) and the voltage inputted by the data voltage terminal Vdata. Consequently, the problem of shifts of the threshold voltage Vth caused by the manufacture process and long time operations of the driving transistor Td can be solved thoroughly, so as to eliminate the influence of the shifts of the threshold voltage Vth on the working current $I_{OLED}$, ensure normal operations of the light emitting device OLED and improve brightness constancy of the display device.

Embodiment Five

In this embodiment, for example, the second signal terminal S2 of the compensation module 30 and the fifth signal terminal S5 of the fingerprint identification module 40 are connected with the same signal line, i.e., the second scanning signal line Scan2, and the first signal terminal S1 of the compensation module 30 and the fourth signal terminal S4 of the fingerprint identification module 40 are connected with the same signal line, i.e., the first scanning signal line Scant, so as to achieve the object of multiplexing the second scanning signal line Scan2 and the first scanning signal line Scan1.

Figure 11:
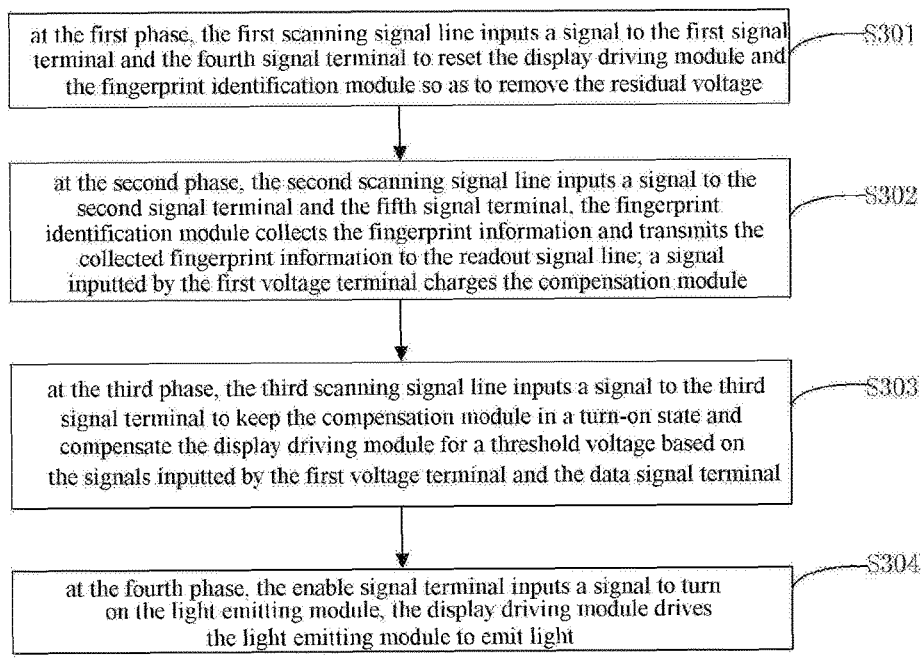
FIG. 11 is a flow chart of a driving method of the pixel circuit as shown in FIG. 6.

The method, as shown in FIG. 11, may comprise:

Step S301: at the first phase P1, the first scanning signal line Scant inputs a signal to the first signal terminal S1 and the fourth signal terminal S4 to reset the display driving module 10 and the fingerprint identification module 40 so as to remove the residual voltage.

Specifically, the first signal terminal S1 of the compensation module 30 and the fourth signal terminal S4 of the fingerprint identification module 40 are connected with the same signal line, i.e., the first scanning signal line Scan1.

On the one hand, the first scanning signal line Scan1 inputs a signal to the first signal terminal S1 to turn on the fifth transistor T5. A voltage of the first voltage terminal V1 resets the gate of the driving transistor Td through the fifth transistor T5.

On the other hand, the first scanning signal line Scan1 inputs a signal to the fourth signal terminal S4 to turn on the eighth transistor T8. The second capacitor C2 is reset through the eighth transistor.

To sum up, relative to Embodiment four, this embodiment accomplishes the resetting of the compensation module 30 and the fingerprint identification module 40 simultaneously at the first phase P1.

Step S302: At the second phase P2, the second scanning signal line Scan2 inputs a signal to the second signal terminal S2 and the fifth signal terminal S5. The fingerprint identification module 40 collects the fingerprint information and transmits the collected fingerprint information to the readout signal line RL. A signal inputted by the first voltage terminal V1 charges the compensation module 30.

Specifically, the second signal terminal S2 of the compensation module 30 and the fifth signal terminal S5 of the fingerprint identification module 40 are connected with the same signal line, i.e., the second scanning signal line Scan2.

On the one hand, the second scanning signal line Scan2 inputs a signal to the second signal terminal S2 to turn on the fourth transistor T4, the sixth transistor T6 and the seventh transistor T7. An input signal of the first voltage terminal V1 charges the first capacitor C1. The first transistor T1, the second transistor T2, the third transistor T3, and the fifth transistor T5 are cut off.

On the other hand, when a finger is in contact with the screen, a coupling capacitance Cf is formed between the valley line of the fingerprint and the detection electrode D, so as to enable the ninth transistor to be in a cut-off state. Or, in the touch control process, a coupling capacitance Cf' is formed between the ridge line of the fingerprint and the detection electrode D so as to enable the ninth transistor to be in a turn-on state.

Here, the second scanning signal line Scan2 inputs a signal to the fifth signal terminal S5 to turn on the tenth transistor T10. When the ninth transistor T9 is in the cut-off state, an initial current signal of the second terminal of the ninth transistor T9 is transmitted to the readout signal line RL through the tenth transistor T10. When the ninth transistor T9 is in the turn-on state, the ninth transistor T9 amplifies the signal inputted by the common voltage terminal Vcom and transmits it to the readout signal line RL through the tenth transistor T10.

The principles of the collecting and transmitting processes of the fingerprint information by the fingerprint identification module 40 are the same as that of Embodiment four, which will not be repeated here. The difference from Embodiment four is that the collection and transmission of the fingerprint information by the fingerprint identification module 40 in this embodiment are performed simultaneously at the second phase P2.

Step S303: At the third phase P3, the third scanning signal line Scan3 inputs a signal to the third signal terminal S3 to keep the compensation module 30 in a turn-on state and compensate the display driving module 10 for a threshold voltage based on the signals inputted by the first voltage terminal V1 and the data signal terminal Vdata.

Specifically, the third scanning signal line Scan3 inputs a signal to the third signal terminal S3 to turn on the third transistor T3. A signal inputted by the data voltage terminal Vdata is outputted to one terminal of the first capacitor C1. A voltage of the other terminal of the first capacitor C1 jumps due to a bootstrap function of the first capacitor C1, so as to enable a gate voltage of the driving transistor Td to jump. The specific jumping process is similar as the jumping process of the node b in the third phase P3 of Embodiment four, which will not be repeated here specifically.

Step S304: At the fourth phase P4, the enable signal terminal EM inputs a signal to turn on the light emitting module. The display driving module 10 drives the light emitting module 20 to emit light.

Specifically, the enable signal terminal EM inputs a signal to turn on the first transistor T1 and the second transistor T2. A current that flows through the first transistor T1, the driving transistor Td and the second transistor T2 drives the light emitting device to emit light. The specific light emitting process is similar as Embodiment one, which will not be repeated here.

Embodiment Six

In this embodiment, for example, the third signal terminal S3 of the compensation module 30 and the fifth signal terminal S5 of the fingerprint identification module 40 are connected with the same signal line, i.e., the third scanning signal line Scan3, and the first signal terminal S1 of the compensation module 30 and the fourth signal terminal S4 of the fingerprint identification module 40 are connected with the same signal line, i.e., the first scanning signal line Scant, so as to achieve the object of multiplexing the third scanning signal line Scan3 and the first scanning signal line Scan1.

Figure 12:
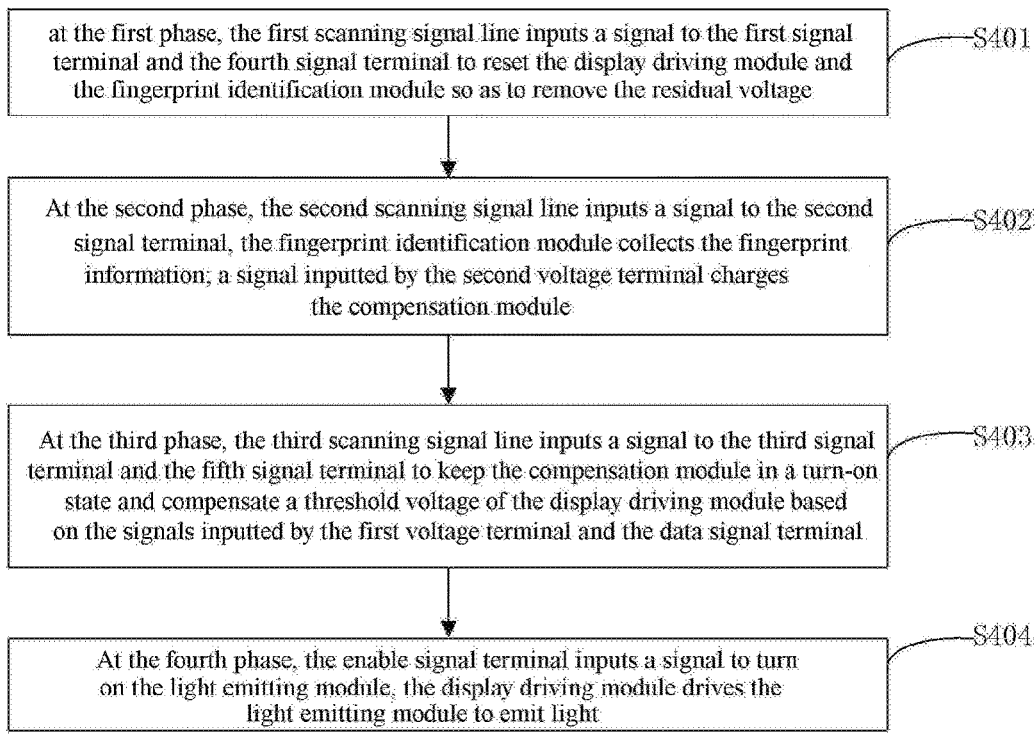
FIG. 12 is a flow chart of a driving method of the pixel circuit as shown in FIG. 7.

The method, as shown in FIG. 12, may comprise:

Step S401: at the first phase P1, the first scanning signal line Scan1 inputs a signal to the first signal terminal S1 and the fourth signal terminal S4 to reset the display driving module 10 and the fingerprint identification module 40 so as to remove the residual voltage.

Specifically, the first signal terminal S1 of the compensation module 30 and the fourth signal terminal S4 of the fingerprint identification module 40 are connected with the same signal line, i.e., the first scanning signal line Scan1.

On the one hand, the first scanning signal line Scan1 inputs a signal to the first signal terminal S1 to turn on the fifth transistor T5. A voltage of the first voltage terminal V1 resets the gate of the driving transistor Td through the fifth transistor T5.

On the other hand, the first scanning signal line Scant inputs a signal to the fourth signal terminal S4 to turn on the eighth transistor T8. The second capacitor C2 is reset through the eighth transistor.

To sum up, relative to Embodiment four, this embodiment accomplishes the resetting of the compensation module 30 and the fingerprint identification module 40 simultaneously at the first phase P1.

Step S402: At the second phase P2, the second scanning signal line Scan2 inputs a signal to the second signal terminal S2. The fingerprint identification module 40 collects the fingerprint information. A signal inputted by the second voltage terminal V2 charges the compensation module 30.

Specifically, the second scanning signal line Scan2 inputs a signal to the second signal terminal S2 to turn on the fourth transistor T4, the sixth transistor T6 and the seventh transistor T7. An input signal of the first voltage terminal V1 charges the first capacitor C1. The first transistor T1, the second transistor T2, the third transistor T3, and the fifth transistor T5 are cut off.

When a finger is in contact with the screen, a coupling capacitance Cf is formed between the valley line of the fingerprint and the detection electrode D, so as to enable the ninth transistor to be in a cut-off state. Or, in the touch control process, a coupling capacitance Cf' is formed between the ridge line of the fingerprint and the detection electrode D so as to enable the ninth transistor to be in a turn-on state. The principle of the collecting process of the fingerprint information by the fingerprint identification module 40 is the same as Embodiment one, which will not be repeated here.

Step S403: At the third phase P3, the third scanning signal line Scan3 inputs a signal to the third signal terminal S3 and the fifth signal terminal S5 to keep the compensation module 30 in a turn-on state and compensate the display driving module 10 for a threshold voltage based on the signals inputted by the first voltage terminal V1 and the data signal terminal Vdata.

The fingerprint identification module 40 transmits the collected fingerprint information to the readout signal line RL.

Specifically, the third signal terminal S3 of the compensation module 30 and the fifth signal terminal S5 of the fingerprint identification module 40 are connected with the same signal line, i.e., the third scanning signal line Scan3.

On the one hand, the third scanning signal line Scan3 inputs a signal to the third signal terminal S3 to turn on the third transistor T3. A signal inputted by the data voltage terminal Vdata is outputted to one terminal of the first capacitor C1. A voltage of the other terminal of the first capacitor C1 jumps due to a bootstrap function of the first capacitor C1, so as to enable a gate voltage of the driving transistor Td to jump. The specific jumping process is similar as that of the node b in the third phase P3 of Embodiment four, which will not be repeated here specifically.

On the other hand, the third scanning signal line Scan3 inputs a signal to the fifth signal terminal S5 to turn on the tenth transistor T10. When the ninth transistor T9 is in the cut-off state, an initial current signal of the second terminal of the ninth transistor T9 is transmitted to the readout signal line RL through the tenth transistor T10. When the ninth transistor T9 is in the turn-on state, the ninth transistor T9 amplifies a signal inputted by the common voltage terminal Vcom, and transmits it to the readout signal line RL through the tenth transistor T10. The principle of the transmitting process of the fingerprint information by the fingerprint identification module 40 is the same as Embodiment four, which will not be repeated here.

Step S404: At the fourth phase P4, the enable signal terminal EM inputs a signal to turn on the light emitting module 20. The display driving module 10 drives the light emitting module 20 to emit light.

Specifically, the enable signal terminal EM inputs a signal to turn on the first transistor T1 and the second transistor T2. A current that flows through the first transistor T1, the driving transistor Td and the second transistor T2 drives the light emitting device to emit light. The specific light emitting process is similar as Embodiment one, which will not be repeated here.

It shall be noted that in the above embodiments of the present invention, for example, the transistors in the pixel circuit are all P-type transistors. When the above transistors are all N-type transistors, the timing signals in FIG. 3 have to be reversed; however, the working principle thereof is the same as above, which will not be repeated here.

The ordinary skilled person in the art can understand that all or parts of the steps for carrying out the above method embodiments can be performed by a program instruction related hardware. The preceding program can be stored in a computer accessible storage medium. When the program is executed, the steps of the above method embodiments are performed. The preceding storage medium, such as ROM, RAM, magnetic disk or optical disk etc., includes various mediums that can store the program codes.

What are stated above are only specific embodiments of the present invention. However, the claimed scope of the present invention is not limited to this. Any modifications or replacements that can be easily conceived by the skilled person familiar with the technical field within the technical scope disclosed by the present invention should be encompassed within the claimed scope of the present invention.

Therefore, the claimed scope of the present invention shall be subject to that of the claims.

The invention claimed is:

1. A method for driving a pixel circuit, the pixel circuit comprising a display driving sub-circuit, a compensation sub-circuit, a light emitting sub-circuit and a fingerprint identification sub-circuit;

the compensation sub-circuit, connected with the display driving sub-circuit, a first signal terminal, a second signal terminal, a third signal terminal, a first voltage terminal, a data signal terminal and a common voltage terminal respectively, for compensating the display driving sub-circuit for a threshold voltage through signals inputted by the first voltage terminal and the data signal terminal under the control of the first signal terminal, the second signal terminal, and the third signal terminal;

the display driving sub-circuit, further connected with the light emitting sub-circuit, for driving the light emitting sub-circuit to emit light after the display driving sub-circuit obtains the compensation for the threshold voltage;

the light emitting sub-circuit, further connected with an enable signal terminal, the first voltage terminal and the second voltage terminal, for emitting light through driving of the display driving sub-circuit under the control of the enable signal terminal, the first voltage terminal and the second voltage terminal;

the fingerprint identification sub-circuit, connected with a fourth signal terminal, a fifth signal terminal and a readout signal line respectively, for collecting fingerprint information under the control of the fourth signal terminal and the fifth signal terminal, and transmitting the collected fingerprint information to the readout signal line;

wherein the third signal terminal and the fifth signal terminal are connected with a third scanning signal line, the second signal terminal and the fourth signal terminal are connected with a second scanning signal line, and the first signal terminal is connected with a first scanning signal line; or, the second signal terminal and the fifth signal terminal are connected with the second scanning signal line, the first signal terminal and the fourth signal terminal are connected with the first scanning signal line, and the third signal terminal is connected with the third scanning signal line, the method comprising:

when a first signal terminal inputs a signal, resetting the display driving sub-circuit to remove a residual voltage;

when a second signal terminal inputs a signal, charging the compensation sub-circuit through a signal inputted by a common voltage terminal;

when a fourth signal terminal inputs a signal, resetting the fingerprint identification sub-circuit and collecting fingerprint information;

when a third signal terminal inputs a signal, keeping the compensation sub-circuit in a turn-on state, and compensating the display driving sub-circuit for a threshold voltage based on signals inputted by the first voltage terminal and the data signal terminal;

when a fifth signal terminal inputs a signal, transmitting the collected fingerprint information to a readout signal line by the fingerprint identification sub-circuit;

when an enable signal terminal inputs a signal, turning on the light emitting sub-circuit, and driving the light emitting sub-circuit to emit light by the display driving sub-circuit.

2. The method for driving a pixel circuit according to claim 1, wherein when the third signal terminal and the fifth signal terminal are connected with the third scanning signal line, the second signal terminal and the fourth signal terminal are connected with the second scanning signal line, the method comprising:

at a first phase, the first scanning signal line inputs a signal to the first signal terminal to turn on the fifth transistor, a voltage of the first voltage terminal resets the gate of the driving transistor through the fifth transistor;

at a second phase, the second scanning signal line inputs a signal to the second signal terminal to turn on the fourth transistor, the sixth transistor and the seventh transistor, an input signal of the common voltage terminal charges the first capacitor; the first transistor, the second transistor, the third transistor, and the fifth transistor are cut off;

the second scanning signal line inputs a signal to the fourth signal terminal to turn on the eighth transistor, the second capacitor is discharged through the eighth transistor;

in the touch control process, a coupling capacitance is formed between a valley line of a fingerprint and the detection electrode, to enable the ninth transistor to be in a cut-off state; or, in the touch control process, a coupling capacitance is formed between a ridge line of a fingerprint and the detection electrode, to enable the ninth transistor to be in a turn-on state;

at a third phase, the third scanning signal line inputs a signal to the third signal terminal to turn on the third transistor, a signal inputted by the data voltage terminal is outputted to one terminal of the first capacitor, a voltage of the other terminal of the first capacitor jumps due to a bootstrap function of the first capacitor, so as to enable a gate voltage of the driving transistor to jump;

the third scanning signal line inputs a signal to the fifth signal terminal to turn on the tenth transistor, when the ninth transistor is in the cut-off state, an initial current signal of the second terminal of the ninth transistor is transmitted to the readout signal line through the tenth transistor; when the ninth transistor is in the turn-on state, the ninth transistor amplifies a signal inputted by the common voltage terminal, and transmits it to the readout signal line through the tenth transistor;

at a fourth phase, the enable signal terminal inputs a signal to turn on the first transistor and the second transistor, a current that flows through the first transistor, the driving transistor and the second transistor drives the light emitting device to emit light.

3. The method for driving a pixel circuit according to claim 1, wherein when the second signal terminal and the fifth signal terminal are connected with the second scanning signal line, the first signal terminal and the fourth signal terminal are connected with the first scanning signal line, the method comprising:

at a first phase, the first scanning signal line inputs a signal to the first signal terminal to turn on the fifth transistor, a voltage of the first voltage terminal resets the gate of the driving transistor through the fifth transistor;

the first scanning signal line inputs a signal to the fourth signal terminal to turn on the eighth transistor, the second capacitor is reset through the eighth transistor;

at a second phase, the second scanning signal line inputs a signal to the second signal terminal to turn on the fourth transistor, the sixth transistor and the seventh transistor, an input signal of the first voltage terminal charges the first capacitor; the first transistor, the second transistor, the third transistor and the fifth transistor are cut off;

in the touch control process, a coupling capacitance is formed between a valley line of a fingerprint and the detection electrode, to enable the ninth transistor to be in a cut-off state; or, in the touch control process, a coupling capacitance is formed between a ridge line of a fingerprint and the detection electrode, to enable the ninth transistor to be in a turn-on state;

the second scanning signal line inputs a signal to the fifth signal terminal to turn on the tenth transistor, when the ninth transistor is in the cut-off state, an initial current signal of the second terminal of the ninth transistor is transmitted to the readout signal line through the tenth transistor; when the ninth transistor is in the turn-on state, the ninth transistor amplifies a signal inputted by the common voltage terminal, and transmits it to the readout signal line through the tenth transistor;

at a third phase, the third scanning signal line inputs a signal to the third signal terminal to turn on the third transistor, a signal inputted by the data voltage terminal is outputted to one terminal of the first capacitor, a voltage of the other terminal of the first capacitor jumps due to a bootstrap function of the first capacitor, so as to enable a gate voltage of the driving transistor to jump;

at a fourth phase, the enable signal terminal inputs a signal to turn on the first transistor and the second transistor, a current that flows through the first transistor, the driving transistor and the second transistor drives the light emitting device to emit light.

4. The method for driving a pixel circuit according to claim 1, wherein when the third signal terminal and the fifth signal terminal are connected with the third scanning signal line, the first signal terminal and the fourth signal terminal are connected with the first scanning signal line, the compensation sub-circuit is further connected with the second voltage terminal, the method comprising:

at a first phase, the first scanning signal line inputs a signal to the first signal terminal to turn on the fifth transistor, a voltage of the first voltage terminal resets the gate of the driving transistor through the fifth transistor;

the first scanning signal line inputs a signal to the fourth signal terminal to turn on the eighth transistor, the second capacitor is reset through the eighth transistor;

at a second phase, the second scanning signal line inputs a signal to the second signal terminal to turn on the fourth transistor, the sixth transistor and the seventh transistor, an input signal of the second voltage terminal charges the first capacitor; the first transistor, the second transistor, the third transistor and the fifth transistor are cut off;

in the touch control process, a coupling capacitance is formed between a valley line of a fingerprint and the detection electrode, to enable the ninth transistor to be in a cut-off state; or, in the touch control process, a coupling capacitance is formed between a ridge line of a fingerprint and the detection electrode, to enable the ninth transistor to be in a turn-on state;

at a third phase, the third scanning signal line inputs a signal to the third signal terminal to turn on the third transistor, a signal inputted by the data voltage terminal is outputted to one terminal of the first capacitor, a voltage of the other terminal of the first capacitor jumps due to a bootstrap function of the first capacitor, so as to enable a gate voltage of the driving transistor to jump;

the third scanning signal line inputs a signal to the fifth signal terminal to turn on the tenth transistor, when the ninth transistor is in the cut-off state, an initial current signal of the second terminal of the ninth transistor is transmitted to the readout signal line through the tenth transistor; when the ninth transistor is in the turn-on state, the ninth transistor amplifies a signal inputted by the common voltage terminal, transmits it to the readout signal line through the tenth transistor;

at a fourth phase, the enable signal terminal inputs a signal to turn on the first transistor and the second transistor, a current that flows through the first transistor, the driving transistor and the second transistor drives the light emitting device to emit light.

5. The method for driving a pixel circuit according to claim 1, wherein the display driving sub-circuit comprises: a driving transistor;
  a gate of the driving transistor is connected with the compensation sub-circuit, a first terminal and a second terminal of the driving transistor are connected with the light emitting sub-circuit.

6. The method for driving a pixel circuit according to claim 1, wherein the light emitting sub-circuit comprises: a first transistor, a second transistor and a light emitting device;
  a gate of the first transistor is connected with the enable signal terminal, a first terminal of the first transistor is connected with the display driving sub-circuit, a second terminal of the first transistor is connected with the second voltage terminal;
  a gate of the second transistor is connected with the enable signal terminal, a first terminal of the second transistor is connected with an anode of the light emitting device, a second terminal of the second transistor is connected with the display driving sub-circuit;
  a cathode of the light emitting device is connected with the first voltage terminal.

7. The method for driving a pixel circuit according to claim 1, wherein the fingerprint identification sub-circuit comprises: an eighth transistor, a ninth transistor, a tenth transistor, a second capacitor and a detection electrode;
  a gate of the eighth transistor is connected with the fourth signal terminal, a first terminal of the eighth transistor is connected with the common voltage terminal, a second terminal of the eighth transistor is connected with one terminal of the second capacitor;
  a gate of the ninth transistor is connected with the one terminal of the second capacitor, a first terminal of the ninth transistor is connected with the common voltage terminal, a second terminal of the ninth transistor is connected with a first terminal of the tenth transistor;
  a gate of the tenth transistor is connected with the fifth signal terminal, a second terminal of the tenth transistor is connected with the readout signal line;
  the detection electrode is connected with the one terminal of the second capacitor;
  the other terminal of the second capacitor is connected with the fifth signal terminal.

8. The method for driving a pixel circuit according to claim 1, wherein the compensation sub-circuit comprises: a third transistor, a fourth transistor, a fifth transistor, a sixth transistor, a seventh transistor and a first capacitor;
  a gate of the third transistor is connected with the third signal terminal, a first terminal of the third transistor is connected with the data signal terminal, a second terminal of the third transistor is connected with one terminal of the first capacitor;
  a gate of the fourth transistor is connected with the second signal terminal, a first terminal of the fourth transistor is connected with the common voltage terminal, a second terminal of the fourth transistor is connected with the one terminal of the first capacitor;
  a gate of the fifth transistor is connected with the first signal terminal, a first terminal of the fifth transistor is connected with a first terminal of the seventh transistor, a second terminal of the fifth transistor is connected with the first voltage terminal;
  a gate of the sixth transistor is connected with the second signal terminal, a first terminal of the sixth transistor is connected with the display driving sub-circuit, a second terminal of the sixth transistor is connected with the common voltage terminal;
  a gate of the seventh transistor is connected with the second signal terminal, a first terminal of the seventh transistor is connected with the other terminal of the first capacitor, a second terminal of the seventh transistor is connected with the display driving sub-circuit.

9. The method for driving a pixel circuit according to claim 1, wherein the compensation sub-circuit comprises: a third transistor, a fourth transistor, a fifth transistor, a sixth transistor, a seventh transistor and a first capacitor;
  a gate of the third transistor is connected with the third signal terminal, a first terminal of the third transistor is connected with the data signal terminal, a second terminal of the third transistor is connected with one terminal of the first capacitor;
  a gate of the fourth transistor is connected with the second signal terminal, a first terminal of the fourth transistor is connected with the first voltage terminal, a second terminal of the fourth transistor is connected with the one terminal of the first capacitor;
  a gate of the fifth transistor is connected with the first signal terminal, a first terminal of the fifth transistor is connected with the other terminal of the first capacitor, a second terminal of the fifth transistor is connected with the first voltage terminal;
  a gate of the sixth transistor is connected with the second signal terminal, a first terminal of the sixth transistor is connected with the display driving sub-circuit, a second terminal of the sixth transistor is connected with the common voltage terminal;
  a gate of the seventh transistor is connected with the second signal terminal, a first terminal of the seventh transistor is connected with the other terminal of the first capacitor, a second terminal of the seventh transistor is connected with the display driving sub-circuit.

10. The method for driving a pixel circuit according to claim 1, wherein the compensation sub-circuit comprises: a third transistor, a fourth transistor, a fifth transistor, a sixth transistor, a seventh transistor and a first capacitor;
  a gate of the third transistor is connected with the third signal terminal, a first terminal of the third transistor is connected with the data signal terminal, a second terminal of the third transistor is connected with one terminal of the first capacitor;
  a gate of the fourth transistor is connected with the second signal terminal, a first terminal of the fourth transistor is connected with the second voltage terminal, a second terminal of the fourth transistor is connected with the one terminal of the first capacitor;

a gate of the fifth transistor is connected with the first signal terminal, a first terminal of the fifth transistor is connected with the other terminal of the first capacitor, a second terminal of the fifth transistor is connected with the first voltage terminal;

a gate of the sixth transistor is connected with the second signal terminal, a first terminal of the sixth transistor is connected with the display driving sub-circuit, a second terminal of the sixth transistor is connected with the common voltage terminal;

a gate of the seventh transistor is connected with the second signal terminal, a first terminal of the seventh transistor is connected with the other terminal of the first capacitor, a second terminal of the seventh transistor is connected with the display driving sub-circuit.

* * * * *